US008844302B2

(12) United States Patent
Takata

(10) Patent No.: US 8,844,302 B2
(45) Date of Patent: Sep. 30, 2014

(54) AIR-CONDITIONING APPARATUS

(75) Inventor: Shigeo Takata, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 555 days.

(21) Appl. No.: 13/203,033

(22) PCT Filed: Mar. 26, 2009

(86) PCT No.: PCT/JP2009/056043
§ 371 (c)(1),
(2), (4) Date: Aug. 24, 2011

(87) PCT Pub. No.: WO2010/109617
PCT Pub. Date: Sep. 30, 2010

(65) Prior Publication Data
US 2011/0302941 A1    Dec. 15, 2011

(51) Int. Cl.
*F25B 49/00* (2006.01)
*F25D 17/02* (2006.01)
*F24D 19/10* (2006.01)
*F24D 3/18* (2006.01)
*F25B 13/00* (2006.01)
*F25B 25/00* (2006.01)
*F24F 11/00* (2006.01)

(52) U.S. Cl.
CPC ......... *F25B 13/00* (2013.01); *F24D 2220/0235* (2013.01); *F25B 2313/02741* (2013.01); *F25B 2700/21* (2013.01); *F25B 2500/221* (2013.01); *F24D 19/1039* (2013.01); *F25B 2500/222* (2013.01); *F25B 49/005* (2013.01); *F24D 3/18* (2013.01); *F25B 2313/0272* (2013.01); *F25B 2309/061* (2013.01); *F24D 2220/042* (2013.01); *F24D 2220/0207* (2013.01); *F24D 2200/123* (2013.01); *F25B 25/005* (2013.01); *F24F 2011/0084* (2013.01); *F24D 2220/06* (2013.01)
USPC ............................................. 62/127; 62/185

(58) Field of Classification Search
CPC ........... F25B 2500/22; F25B 2500/221; F25B 2500/222; F25B 2700/04; F25D 17/02; F25D 2700/00
USPC .................... 62/125, 126, 127, 129, 185, 201
See application file for complete search history.

(56) References Cited

U.S. PATENT DOCUMENTS 3,702,064 A * 11/1972 Ciolli .............................. 62/158
6,085,532 A *  7/2000 Sibik .............................. 62/179
6,298,677 B1 * 10/2001 Bujak, Jr. ........................ 62/158

FOREIGN PATENT DOCUMENTS

| JP | 62-084241 A  | 4/1987  |
| JP | 05-099542 A  | 4/1993  |
| JP | 5-149539 A   | 6/1993  |
| JP | 6-207746 A   | 7/1994  |
| JP | 2003-130482 A | 5/2003  |
| JP | 2003-343936 A | 12/2003 |

OTHER PUBLICATIONS

Chinese Office Action (Text Portion of the First Office Action) dated Aug. 29, 2013, issued by the Chinese Patent Office in corresponding Chinese Patent Application No. 200980158379.6, and English language translation of Office Action. (7 pages).
International Search Report (PCT/ISA/210) issued on Jun. 30, 2009, by Japanese Patent Office as the International Searching Authority for International Application No. PCT/JP2009/056043.
Japanese Office Action (Notice of Reasons For Rejection) dated Nov. 27, 2012, issued in corresponding Japanese Patent Application No. 2011-505740, and English language translation of Office Action. (5 pages).

* cited by examiner

*Primary Examiner* — Marc Norman
(74) *Attorney, Agent, or Firm* — Buchanan Ingersoll & Rooney PC

(57) ABSTRACT

An air-conditioning apparatus has at least one intermediate heat exchanger that exchanges heat between a refrigerant changing in two phases or a refrigerant in a supercritical state and a heat medium such as water and anti-freezing fluid different from the refrigerant, a refrigeration cycle in which a compressor, a heat-source side heat exchanger, at least one expansion valve, and a refrigerant-side channel of the intermediate heat exchanger are connected via a pipeline through which the refrigerant flows, and a heat-medium circulation circuit in which a heat-medium side channel of the intermediate heat exchanger, a pump, and a use-side heat exchanger are connected via a pipeline through which the heat medium flows, in which in the heat-medium circulation circuit, a fourth temperature sensor that detects a temperature of the heat-medium flowing out of the use-side heat exchanger is provided, and leakage of the heat medium from the heat-medium circulation circuit is detected on the basis of a change amount of a detected temperature of the fourth temperature sensor.

6 Claims, 11 Drawing Sheets

AIR-CONDITIONING APPARATUS

TECHNICAL FIELD

The present invention relates to an air-conditioning apparatus applied to a multiple-unit air conditioner for a building and the like.

BACKGROUND ART

Hitherto, a multi air conditioner for a building to which an air-conditioning apparatus that performs a cooling operation or a heating operation by circulating a refrigerant between an outdoor unit, which is a heat source machine arranged outside a room, and an indoor unit arranged inside the room so as to convey cooling energy or heating energy to a region to be air-conditioned such as an indoor space is applied has been present. As the refrigerant used in such an air-conditioning apparatus, HFC refrigerants, for example, are widely used. Also, a natural refrigerant such as carbon dioxide ($CO_2$) has begun to be used.

Also, an air-conditioning apparatus of other configurations represented by a chiller system is present. In this air-conditioning apparatus, cooling energy or heating energy is generated in a heat source unit arranged outdoors, the cooling energy or heating energy is transferred to a heat medium such as water, an anti-freezing fluid by a heat exchanger arranged in the outdoor unit, and this is conveyed through a heat-medium circulation circuit to a fan coil unit, a panel heater and the like, which are an indoor unit arranged in a region to be air-conditioned, so as to perform the cooling operation or heating operation (See Patent Document 1, for example).

Among these prior-art air-conditioning apparatuses, in a prior-art air-conditioning apparatus in which a refrigerant is circulated through an indoor unit, it is likely that a user is negatively affected if the refrigerant leaks into the room. Thus, for a prior-art air-conditioning apparatus in which the refrigerant is circulated through the indoor unit, the air-conditioning apparatus that can detect leakage of the refrigerant into the room (through pipelines of a use-side heat exchanger and the vicinity of the use-side heat exchanger) has been proposed, and an air-conditioning apparatus "configured to be provided with a single heat source unit A having a compressor 1, a four-way switching valve 2 that switches a channel of a refrigerant discharged from this compressor, and a heat-source unit side heat exchanger 3, a plurality of indoor units B, C, and D having an indoor heat exchanger 5 and a flow-rate controller 9, and a relay unit having a first branch portion 10 having valve devices 8a and 8b that connect the heat source unit and the indoor unit by first and second connection pipelines 6 and 7 and also connect one end of each of the indoor heat exchangers to the first and second connection pipelines capable of being switched, a valve device 20 connected to each of the other ends of the indoor heat exchangers, respectively, and a second branch portion 11 that can connect the other ends of each of the indoor heat exchangers to the second connection pipeline through check valves 17 and 18 connected to the valve device, respectively" (See Patent Document 2, for example), for example, is proposed.

Patent Document 1: Japanese Unexamined Patent Application Publication No. 2003-343936 (page 5, FIG. 1)
Patent Document 2: Japanese Unexamined Patent Application Publication No. 2003-130482 (Abstract, FIG. 1)

DISCLOSURE OF INVENTION

Problems to be Solved by the Invention

As described above, in the prior-art air-conditioning apparatus in which the refrigerant is circulated through the indoor unit, the air-conditioning apparatus that can detect leakage of the refrigerant into the room (from pipelines of the use-side heat exchanger and the vicinity of the use-side heat exchanger) is proposed. That is, the air-conditioning apparatus that can detect leakage of the refrigerant from the pipeline disposed in the vicinity of the inside of the room is proposed.

However, the prior-ad air-conditioning apparatus in which a heat medium is circulated through the indoor unit has a problem that since the negative effect of the heat medium on a user is small and the like, detection of leakage of the heat medium from a heat-medium circulation circuit arranged in the vicinity of the inside of the room has not been considered sufficiently.

The present invention was made in order to solve the above problem and an object thereof is to obtain an air-conditioning apparatus that can detect leakage of a heat medium from a heat-medium circulation circuit.

Means for Solving the Problems

An air-conditioning apparatus according to the present invention has at least one intermediate heat exchanger that exchanges heat between a refrigerant changing in two phases or a refrigerant in a supercritical state and a heat medium such as water and anti-freezing fluid different from the refrigerant, a refrigeration cycle in which a compressor, an outdoor heat exchanger, at least one expansion valve, and a refrigerant-side channel of the intermediate heat exchanger are connected via a pipeline through which the refrigerant flows, and a heat-medium circulation circuit in which a heat-medium side channel of the intermediate heat exchanger, a pump, and a use-side heat exchanger are connected via a pipeline through which the heat medium flows, in which in the heat-medium circulation circuit, a heat-medium temperature detection portion that detects a temperature of the heat-medium flowing out of the heat-medium circulation circuit is provided, and on the basis of a change amount of the detection temperature of the heat medium temperature detection portion, leakage of the heat medium from the heat-medium circulation circuit is detected.

Also, an air-conditioning apparatus according to the present invention has at least one intermediate heat exchanger that exchanges heat between a refrigerant changing in two phases or a refrigerant in a supercritical state and a heat medium such as water and anti-freezing fluid different from the refrigerant, a refrigeration cycle in which a compressor, an outdoor heat exchanger, at least one expansion valve and a refrigerant-side channel of the intermediate heat exchanger are connected via a pipeline through which the refrigerant flows, and a heat-medium circulation circuit in which a heat-medium side channel of the intermediate heat exchanger, a pump, and a use-side heat exchanger are connected via a pipeline through which the heat medium flows, in which the pump is provided with a current value detection portion that detects a value of a current flowing through the pump, and leakage of the heat medium from the heat-medium circulation circuit is detected on the basis of a detected value of the current value detection portion.

Also, an air-conditioning apparatus according to the present invention has at least one intermediate heat exchanger that exchanges heat between a refrigerant changing in two phases or a refrigerant in a supercritical state and a heat medium such as water and anti-freezing fluid different from the refrigerant, a refrigeration cycle in which a compressor, an outdoor heat exchanger, at least one expansion valve, and a refrigerant-side channel of the intermediate heat exchanger are connected via a pipeline through which the refrigerant flows, and a heat-medium circulation circuit in which a heat-medium side channel of the intermediate heat exchanger, a pump, and a use-side heat exchanger are connected via a pipeline through which the heat medium flows, in which the pump is provided with a pump temperature detection portion that detects a temperature of the pump, and leakage of the heat medium from the heat-medium circulation circuit is detected on the basis of a detected temperature of the pump temperature detection portion.

Advantages

In the present invention, on the basis of at least one detected value of a temperature of a heat medium flowing through a heat-medium circulation circuit, a value of a current flowing in a pump, and a temperature of the pump, leakage of the heat medium from the heat-medium circulation circuit can be detected.

Figure 1:
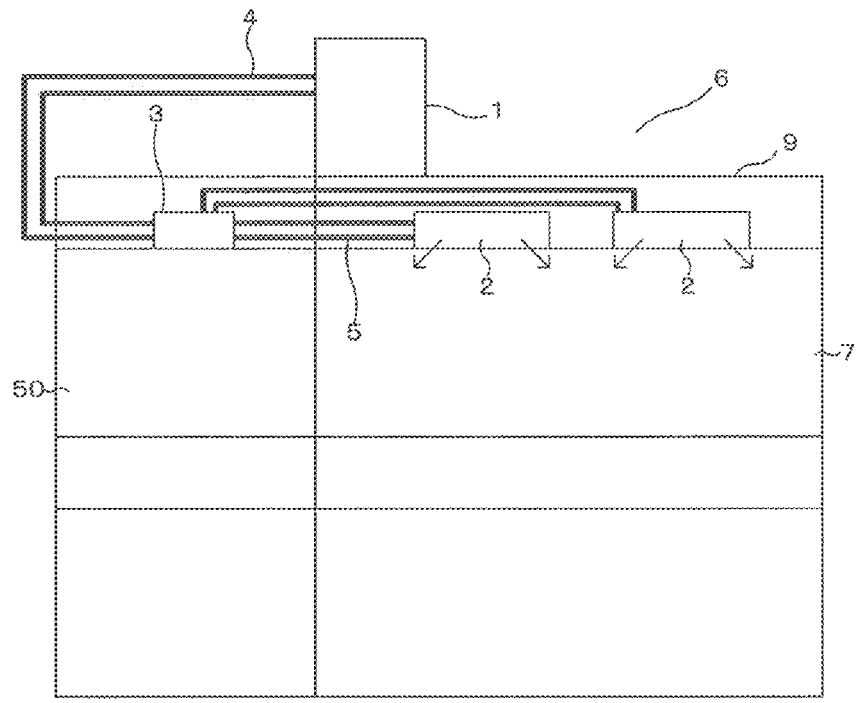
FIG. 1 is an entire configuration diagram illustrating an example of an installed state of an air-conditioning apparatus according to Embodiment 1.

REFERENCE NUMERALS 1 heat-source device (outdoor unit), 2 indoor unit, 2a indoor unit, 2b indoor unit, 2c indoor unit, 2d indoor unit, 3 relay unit, 3a first relay unit, 3b second relay unit, 4 refrigerant pipeline, 4a first connection pipeline, 4b second connection pipeline, 5 pipeline, 5a pipeline, 5b pipeline, 6 outdoor space, 7 living space, 9 building, 10 compressor, 11 four-way valve, 12 heat-source side heat exchanger, 13a check valve, 13b check valve, 13c check valve, 13d check valve, 14 gas-liquid separator, 15 intermediate heat exchanger, 15a first intermediate heat exchanger, 15b second intermediate heat exchanger, 16 expansion valve, 16a expansion valve, 16b expansion valve, 16c expansion valve, 16d expansion valve, 16e expansion valve, 17 accumulator, 21 pomp, 21a first pump, 21b second pump, 22 channel switching valve, 22a channel switching valve, 22b channel switching valve, 22c channel switching valve, 22d channel switching valve, 23 channel switching valve, 23a channel switching valve, 23b channel switching valve, 23c channel switching valve, 23d channel switching valve, 24 stop valve, 24a stop valve, 24b stop valve, 24c stop valve, 24d stop valve, 25 flow control valve, 25a flow control valve, 25b flow control valve, 25c flow control valve, 25d flow control valve, 26 use-side heat exchanger, 26a use-side heat exchanger, 26b use-side heat exchanger, 26c use-side heat exchanger, 26d use-side heat exchanger, 27 bypass, 27a bypass, 27b bypass, 27c bypass, 27d bypass, 31 first temperature sensor, 31a first temperature sensor, 31b first temperature sensor, 32 second temperature sensor, 32a second temperature sensor, 32b second temperature sensor, 33 third temperature sensor, 33a third temperature sensor, 33b third temperature sensor, 33c third temperature sensor, 33d third temperature sensor, 34 fourth temperature sensor, 34a fourth temperature sensor, 34b fourth temperature sensor, 34c fourth temperature sensor, 34d fourth temperature sensor, 35 fifth temperature sensor, 36 pressure sensor, 37 sixth temperature sensor, 38 seventh temperature sensor, 50 non-living space, 60 controller, 71a discharge valve, 71b discharge valve, 75a current detection portion, 75b current detection portion, 80a eighth temperature sensor, 80b eighth temperature sensor, 100 air-conditioning apparatus

BEST MODES FOR CARRYING OUT THE INVENTION

Embodiment 1

Figure 2:
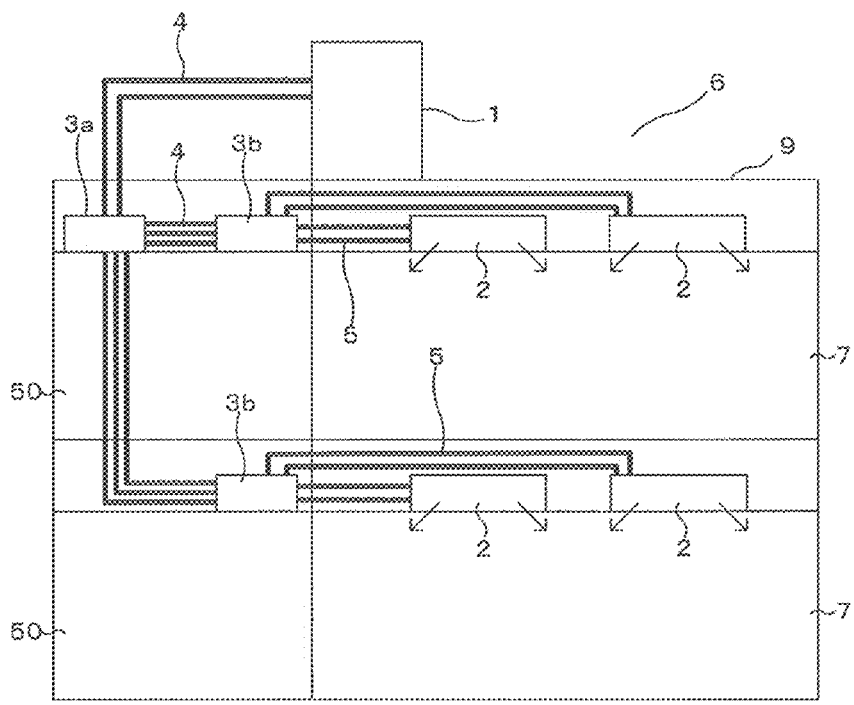
FIG. 2 is an entire configuration diagram illustrating an example of the installed state of the air-conditioning apparatus according to Embodiment 1.

FIGS. 1 and 2 are each entire configuration diagram illustrating an example of an installed state of an air-conditioning apparatus according to Embodiment 1 of the present invention. On the basis of FIGS. 1 and 2, a configuration of the air-conditioning apparatus will be described. This air-conditioning apparatus performs a cooling operation or a heating operation using refrigeration cycles (a refrigeration cycle and a heat-medium circulation circuit) through which refrigerants (a heat-source side refrigerant and a heat medium (water, anti-freezing fluid and the like)) is circulated. In the following drawings including FIG. 1, the relationship among the sizes of constituent members might be different from the actual one.

As shown in FIG. 1, this air-conditioning apparatus has a single heat-source device 1 as a heat-source machine, a plurality of indoor units 2, and a relay unit 3 located between the heat-source device 1 and the indoor units 2. The relay unit 3 exchanges heat between the heat-source side refrigerant and the heat medium. The heat-source device 1 and the relay unit 3 are connected by a refrigerant pipeline 4 through which the heat-source side refrigerant is guided, and the relay unit 3 and the indoor unit 2 are connected by a pipeline 5 through which the heat medium is guided so that cooling energy or heating energy generated in the heat-source device 1 is delivered to the indoor units 2. The connected numbers of the heat-source devices 1, the indoor units 2, and the relay units 3 are not limited to those illustrated in the figure.

The heat-source device 1 is usually arranged in an outdoor space 6, which is a space outside a building 9 such as a tower building and the like and supplies cooling energy or heating energy to the indoor unit 2 via the relay unit 3. The indoor unit 2 is arranged in a living space 7 inside the building 9 such as a living room or a server room to which air for cooling or it for heating can be conveyed and supplies the air for cooling or the air for heating to the living space 7 that is to be a region to be air-conditioned. The relay unit 3 is formed in such a manner that it can be installed at a position different from the outdoor space 6 and the living space 7 (hereinafter referred to as a non-living space 50) as a separate body from the heat-source device 1 and the indoor unit 2, connects with the heat-source device 1 and the indoor unit 2, and transfers cooling energy or heating energy supplied from the heat-source device 1 to the indoor unit 2.

The outdoor space 6 is assumed to be a place outside the building 9 or a place on the roof as shown in FIG. 1, for example. The non-living space 50 is assumed to be a space inside the building 9 but different from the living space 7 or a place where people are not present all the time such as a corridor, a space in a ceiling of a common zone, a common portion with an elevator or the like, a machine room, a computer room, a warehouse or the like, for example. Also, the living space 7 is assumed to be a place inside the building 9 and where people are present all the time or a large or a small number of people are present even temporarily, or an office, a classroom, a meeting room, a dining room, a server room or the like, for example.

The heat-source device 1 and the relay unit 3 are connected to each other using two refrigerant pipelines 4. Also, the relay unit 3 and each indoor unit 2 are connected to each other by two pipelines, 5, respectively. As described above, by connecting the heat-source device 1 to the relay unit 3 by the two refrigerant pipelines 4 and by connecting the indoor unit 2 to the relay unit 3 by the two pipelines 5, construction of the air-conditioning apparatus is facilitated.

As illustrated in FIG. 2, the relay unit 3 may be formed so as to be divided into one first relay unit 3a and two second relay units 3b branching off from the first relay unit 3a. By using the above configuration, a plurality of the second relay units 3b can be connected to the one first relay unit 3a, in this configuration, the number of the refrigerant pipelines 4 between the first relay unit 3a and the second relay units 3b is three. Details of this pipeline path will be described later.

In FIGS. 1 and 2, the indoor unit 2 is illustrated as a ceiling cassette type as an example, but not limited to that, and any type can be used as long as it is formed in such a manner as to be capable of blowing out cooling energy or heating energy directly or through a duct to the living space 7 such as a ceiling-concealed type, a ceiling-suspended type and the like.

Also, in FIG. 1, an example in which the heat-source device 1 is installed in the outdoor space 6 is shown, but is not limited to that. For example, the heat source device 1 may be installed in a closed-off space such as a machine room with a ventilation port and the like, may be installed inside the building 9 if waste heat can be exhausted to the outside of the building 9 by an exhaust air duct or may be also installed inside the building 9 if the heat-source device 1 of a water-cooled type is used. If the heat-source device 1 is installed in such a place, no particular problem would occur.

Also, the relay unit 3 may be installed in the vicinity of the heat-source device 1. However, if the distance from the relay unit 3 to the indoor unit 2 is very large, conveying power for the heat medium becomes considerably large, which reduces an effect of energy saving.

Figure 3:
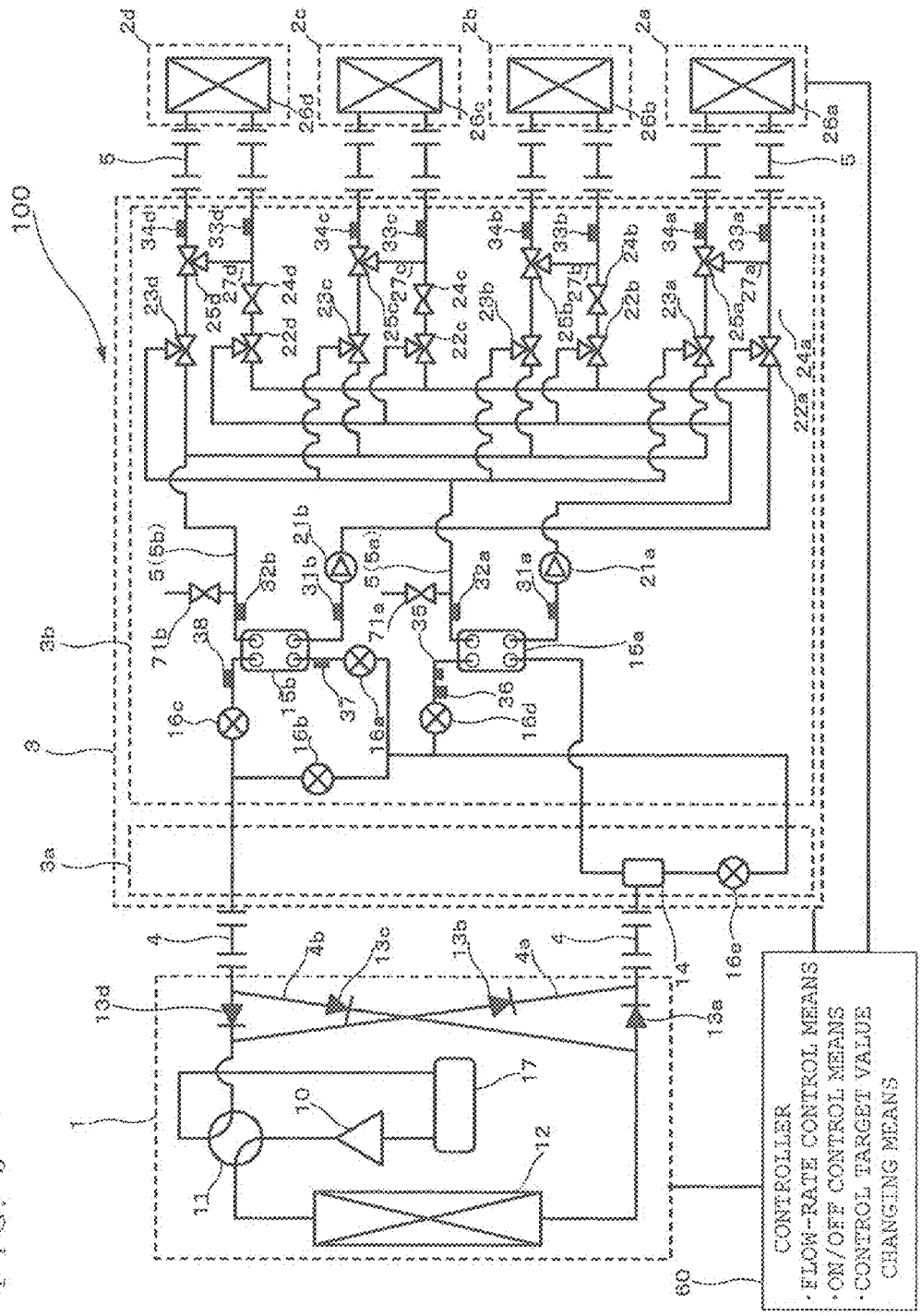
FIG. 3 is an outline circuit diagram illustrating a configuration of the air-conditioning apparatus according to Embodiment 1.

FIG. 3 is an outline circuit diagram illustrating a configuration of the air conditioning apparatus 100. On the basis of FIG. 3, the detailed configuration of the air-conditioning apparatus 100 will be described. As shown in FIG. 2, the heat source device 1 and the relay unit 3 are connected to each other through a first intermediate heat exchanger 15a and a second intermediate heat exchanger 15b provided in the second relay unit 3b. Both the relay unit 3 and the indoor unit 2 are connected through the first intermediate heat exchanger 15a and the second intermediate heat exchanger 15b provided in the second relay unit 3b. A configuration and functions of each constituent device provided in the air-conditioning apparatus 100 will be described below. In FIG. 3 and thereafter, an example in which the relay unit 3 is divided into the first relay unit 3a end the second relay unit 3b is illustrated.

(Heat-Source Device 1)

In the heat-source device 1, a compressor 10, a four-way valve 11, a heat source side heat exchanger (outdoor heat exchanger) 12, and an accumulator 17 are connected in series by the refrigerant pipeline 4 and contained. Also, in the heat-source device 1, a first connection pipeline 4a, a second connection pipeline 4b, a cheek valve 13a, a check valve 13b, a check valve 13c, and a check valve 13d are provided. By providing the first connection pipeline 4a, the second connection pipeline 4b, the check valve 13a, the check valve 13b, the check valve 13c, and the cheek valve 13d, regardless of the operation required by the indoor unit 2, the flow of a heat-source side refrigerant made to flow into the relay unit 3 can be directed in a certain direction.

The compressor 10 sucks the heat-source side refrigerant, compresses the heat-source side refrigerant to bring it into a high-temperature and high-pressure state and can be constituted by an inverter compressor or the like capable of capacity control, for example. The four-way valve 11 switches a flow of the heat-source side refrigerant during a heating operation between a flow of the heat-source side refrigerant during a cooling operation. The heat-source side neat exchanger 12 functions as an evaporator during the heating operation and functions as a condenser during the coding operation, exchanges heat between air supplied from an air blower such as a fan, not shown, and the heat-source side refrigerant and evaporates and gasifies or condenses and liquefies the heat-source side refrigerant. The accumulator 17 is provided on the suction side of the compressor 10 and stores an excess refrigerant.

The check valve 13d is provided in the refrigerant pipeline 4 between the relay unit 3 and the four-way valve 11 and allows the flow of the heat-source side refrigerant only in a predetermined direction (direction from the relay unit 3 to the heat-source device 1). The check valve 13a is provided in the refrigerant pipeline 4 between the heat-source side heat exchanger 12 and the relay unit 3 and allows the flow of the heat-source side refrigerant only in a predetermined direction (direction from the heat-source side 1 to the relay unit 3). The check valve 13b is provided in the first connection pipeline 4a and allows the flow of the heat-source side refrigerant only in a direction from the downstream side of the check valve 13d to the downstream side of the check valve 13a. The check valve 13c is provided in the second connection pipeline 4b and allows the flow of the heat-source side refrigerant only in a direction from the upstream side of the check valve 13d to the upstream side of the check valve 13a.

The first connection pipeline 4a connects the refrigerant pipeline 4 on the downstream side of the check valve 13d to the refrigerant pipeline 4 on the downstream side of the check valve 13a in the heat-source device 1. The second connection pipeline 4b connects the refrigerant pipeline 4 on the upstream side of the check valve 13d to the refrigerant pipeline 4 on the upstream side of the check valve 13a in the heat-source device 1. In FIG. 2, an example in which the first connection pipeline 4a, the second connection pipeline 4b, the check valve 13a, the check valve 13b, the check valve 13c, and the check valve 13d are provided is shown, but the configuration is not limited to this, and these components do not necessarily have to be provided.

(Indoor Unit 2)

In each of the indoor units 2, a use-side heat exchanger 26 is mounted. This use-side heat exchanger 26 is connected to a stop valve 24 and a flow control valve 25 of the second relay unit 3b through the pipeline 5. This use-side heat exchanger 26 exchanges heat between the air supplied from the air blower such as a fan, not shown, and the heat medium and generates heating air or cooling air to be supplied to the region to be air-conditioned.

In FIG. 3, the case in which four indoor units 2 are connected to the second relay unit 3b is shown as an example, and these units are illustrated as an indoor unit 2a, an indoor unit 2b, an indoor unit 2c, and an indoor unit 2d from the lower side of the figure. Also, in accordance with the indoor units 2a to 2d, the use-side heat exchanger 26 is illustrated as a use-side heat exchanger 26a, a use-side heat exchanger 26b, a use-side heat exchanger 26c, and a use side heat exchanger 26d from the lower side of the figure. Similarly to FIG. 1, the number of connected indoor units 2 is not limited to four as shown in FIG. 3.

(Relay Unit 3)

The relay unit 3 is constituted by the first relay unit 3a and the second relay unit 3b in separate housings. By using this configuration, a plurality of the second relay units 3b can be connected to the single first relay unit 3a, as described above. In the first relay unit 3a, a gas-liquid separator 14, en expansion valve 16e, a pressure sensor 39, and a pressure sensor 40 are disposed. In the second relay unit 3b, two intermediate heat exchangers 15, four expansion valves 16, two pumps 21, four channel switching valves 22, four channel switching valves 23, tour stop valves 24, and four flow control valves 25 are disposed.

The gas-liquid separator 14 is connected to one refrigerant pipeline 4 connected to the heat-source device 1 and two refrigerant pipelines 4 that connect the first intermediate heat exchanger 15a and the second intermediate heat exchanger 15b of the second relay unit 3b and separates the heat-source side refrigerant supplied from the heat-source device 1 into a steam refrigerant and a liquid refrigerant. The expansion valve 16e is disposed between the refrigerant pipeline 4 that connects the expansion valve 16a as well as the expansion valve 16b and the gas-liquid separator 14 and functions as a pressure-reducing valve or a throttle device so as to reduce the pressure of the heat-source side refrigerant and to expand it. The expansion valve 16e is preferably constituted by a device capable of variably controlling an opening degree such as an electronic expansion valve, for example. The pressure sensor 39 is disposed on a refrigerant pipeline that connects the refrigerant pipeline 4 and the gas-liquid separator 14 and detects a pressure of the heat-source side refrigerant flowing from the heat-source device 1 into the first relay unit (or in more detail, the gas-liquid separator 14). The pressure sensor 40 is disposed on a refrigerant pipeline that connects the expansion valve 16b and the expansion valve 16c to the refrigerant pipeline 4 and detects a pressure of the heat-source side refrigerant flowing out of the second relay unit 3b (and flowing into the heat-source device 1).

The two it heat exchangers 15 (the first intermediate heat exchanger 15a and the second intermediate heat exchanger 15b) function as condensers or evaporators, exchange heat between the heat-source side refrigerant and the heat medium and supply cooling energy or heating energy generated in the heat-source device 1 to the indoor unit 2. In the flow of the heat-source side refrigerant, the first intermediate heat exchanger 15 is disposed between the gas-liquid separator 14 and the expansion valve 16d and serves for heating of the heat medium. In the flow of the heat-source side refrigerant, the second intermediate heat exchanger 15b is disposed between the expansion valve 16a and the expansion valve 16c and serves for cooling the heat medium.

The four expansion valves 16 (expansion valves 16a to 16d) function as pressure-reducing valves or throttle devices and reduce the pressure of the heat-source side refrigerant and expand it. The expansion valve 16a is disposed between the expansion valve 16e and the second intermediate heat exchanger 15b. The expansion valve 16b is disposed to be parallel with the expansion valve 16a. The expansion valve 16c is disposed between the second intermediate heat exchanger 15b and the first relay unit 3a. The expansion valve 16d is disposed between the first intermediate heat exchanger 15a and the expansion valves 16a as well as the expansion valve 16b. The four expansion valves 16 are preferably constituted by devices capable of variably controlling opening degrees such as electronic expansion valves, for example.

The two pumps 21 (first pump 21a and second pump 21b) circulate the heat medium flowing through the pipeline 5. The first pump 21a is disposed on the pipeline 5 between the first intermediate heat exchanger 15a and the channel switching valve 22. The second pump 21b is disposed on the pipeline 5 between the second intermediate heat exchanger 15b and the channel switching valve 22. The first pump 21a and the second pump 21b are not particularly limited to a certain type and are preferably pumps capable of capacity control, for example.

The four channel switching valves 22, (channel switching valves 22a to 22d) are constituted by three-way valves and switch the channels of the heat medium. The channel switching valves 22 are provided in a number (four, here) in accordance with the number of installed indoor units 2. The channel switching valves 22 are provided on the inlet sides of heat medium channels of the use-side heat exchangers 26 with one of the three ways connected to the first intermediate heat exchanger 15a, one of the three was to the second intermediate heat exchanger 15b, and one of the three ways to the stop valve 24, respectively. The channel switching valve 22a, the channel switching valve 22b, the channel switching valve 22c, and the channel switching valve 22d are shown from the tower side in the figure corresponding to the indoor units 2.

The four channel switching valves 23 (channel switching valves 23a to 23d) are constituted by three-way valves and switch the channels of the heat medium. The channel switching valves 23 are provided in a number (four, here) in accordance with the number of installed indoor units 2. The channel switching valves 23 are provided on outlet sides of heat medium channels of the use side heat exchangers 26 with one of three ways connected to the first intermediate heat exchanger 15a, one of the three ways to the second intermediate heat exchanger 15b, and one of the three ways to the flow control valve 25, respectively. The channel switching valve 23a, the channel switching valve 23b, the channel switching valve 23c, and the channel switching valve 23d are shown from the lower side in the figure while making them correspond to the indoor units 2.

The four stop valves 24 (stop valves 24a to 24d) are constituted by two-way valves and open/close the pipeline 5. The stop valves 24 are provided in a number (four, here) in accordance with the installed number of the indoor units 2. The stop valves 24 have one end connected to the use-side heat exchangers 26 and the other to the channel switching valves 22, respectively, and are disposed on the inlet sides of the heat medium channels of the use-side heat exchangers 26. The stop valve 24a, the stop valve 24b, the stop valve 24c, and the stop valve 24d are shown from the lower side of the figure corresponding to the indoor units 2.

The four flow control valves 25 (flow control valves 25a to 25d) are constituted by three-way valves and switch the channels of the heat medium. The flow control valves 25 are provided in a number (four, here) in accordance with the installed number of the indoor units 2. The flow control valves 25 are provided on the outlet sides of the heat medium channels of the use-side heat exchangers 26 with one of the three ways connected to the use side heat exchanger 26, one of the three ways to a bypass 27, and one of the three ways to the channel switching valve 23, respectively. The flow control valve 25a, the flow control valve 25b, the flow control valve 25c, and the flow control valve 25d are shown from the lower side of the figure corresponding to the indoor units 2.

The bypasses 27 are provided so as to connect the pipeline 5 between the stop valves 24 and the use-side heat exchangers 26 to the flow control valves 25. The bypasses 27 are disposed in a number (four, here, that is, a bypass 27a, a bypass 27b, a bypass 27c, and a bypass 27d) in accordance with the installed number of the indoor units 2. The bypass 27a, the bypass 27b, the bypass 27c, and the bypass 27d are shown from the lower side of the figure corresponding to the indoor units 2.

Also, in the second relay unit 3b, two first temperature sensors 31, two second temperature sensors 32, four third temperature sensors 33, four fourth temperature sensors 34, a fifth temperature sensor 35, a pressure sensor 36, a sixth temperature sensor 37, and a seventh temperature sensor 38 are disposed. Information detected by these detecting means is sent to a controller (controller 60) that controls an operation of the air-conditioning apparatus 100 and is used for control such as a running frequency of the pump 21 switching of the channel of the heat medium flowing through the pipeline 5 and the like.

The two first temperature sensors 31 (first temperature sensor 31a and first temperature sensor 31b) detect the temperature of the heat medium flowing out of the intermediate heat exchanger 15, that is, the heat medium at the outlet of the intermediate heat exchanger 15 and is preferably constituted by, for example, a thermistor or the like. The first temperature sensor 31a is disposed on the pipeline 5 on the inlet side of the first pump 21a. The first temperature sensor 31b is disposed on the pipeline 5 on the inlet side of the second pump 21b.

The two second temperature sensors 32 (second temperature sensor 32a and second temperature sensor 32b) detect the temperature of the heat medium flowing into the intermediate heat exchanger 15, that is, the heat medium at the inlet of the intermediate heat exchanger 15 and is preferably constituted by, for example, a thermistor or the like. The second temperature sensor 32a is disposed on the pipeline 5 on the inlet side of the first intermediate heat exchanger 15a. The second temperature sensor 32b is disposed on the pipeline 5 on the inlet side of the second intermediate heat exchanger 15b.

The four third temperature sensors 33 (third temperature sensors 33a to 33d) are disposed on the inlet sides of the heat medium channels of the use-side heat exchangers 26 so as to detect the temperature of the heat medium flowing into the use-side heat exchangers 25 and is preferably constituted by thermistors or the like. The third temperature sensors 33 are provided in a number (four, here) in accordance with the installed number of the indoor units 2. The third temperature sensor 33a, the third temperature sensor 33b, the third temperature sensor 33c, and the third temperature sensor 33d are shown from the lower side in the figure while being made correspond to the indoor units 2.

The four fourth temperature sensors 34 (fourth temperature sensors 34a to 34d) are provided on the outlet sides of the heat medium channels of the use-side heat exchangers 26 and detect the temperature of the heat medium flowing out of the use-side heat exchanger 26 and are preferably constituted by thermistors or the like. The fourth temperature sensors 34 are provided in a number (four, here) in accordance with the installed number of the indoor units 2. The fourth temperature sensor 34a, the fourth temperature sensor 34b, the fourth temperature sensor 34c, and the fourth temperature sensor 34d are shown from the lower side in the figure corresponding to the indoor units 2.

The fifth temperature sensor 35 is provided on the outlet side of the heat source side refrigerant channel of the first intermediate heat exchanger 15a and detects the temperature of the heat-source side refrigerant flowing out of the first intermediate heat exchanger 15a and is preferably constituted by a thermistor or the like. The pressure sensor 36 is provided on the outlet side of the heat-source side refrigerant channel of the first intermediate heat exchanger 15a and detects the pressure of the heat-source side refrigerant, flowing out of the first intermediate heat exchanger 15a and is preferably constituted by a pressure sensor or the like.

The sixth temperature sensor 37 is provided on the inlet side of the heat source side refrigerant channel of the second intermediate heat exchanger 15b and detects the temperature of the heat-source side refrigerant flowing into the second intermediate heat exchanger 15b and is preferably constituted by a thermistor or the like. The seventh temperature sensor 38 is provided on the outlet side of the heat-source side refrigerant channel of the second intermediate heat exchanger 15b and detects the temperature of the heat-source side refrigerant flowing out of the second intermediate heat exchanger 15b and is preferably constituted by a thermistor or the like.

The pipeline 5 through which the heat medium is guided is constituted by the one connected to the first intermediate heat exchanger 15a (hereinafter referred to as a pipeline 5a) and the other connected to the second intermediate heat exchanger 15b (hereinafter referred to as a pipeline 5b). The pipeline 5a and the pipeline 5b are branched in a number (here, four) in accordance with the number of indoor units 2 connected to the relay unit 3. Then, the pipeline 5a and the pipeline 5b are connected by the channel switching valve 22, the channel switching valve 23, and the flow control valve 26. By controlling the channel switching valve 22 and the channel switching valve 23, whether to allow the heat medium guided through the pipeline 6a to flow into the use heat exchanger 26 or to allow the heat medium guided through the pipeline 5b to flow into the use-side heat exchanger 26 is determined.

Also, in the air-conditioning apparatus 100, the controller 60 is disposed that controls operations of the neat-source device 1, the relay unit 3 and each device mounted in the indoor units 2 on the basis of information from a remote controller that receives an instruction from each detecting means and a user. The controller 60 controls the running frequency of the compressor 10 mounted in the heat-source device 1, the rotation number of a fan installed in the vicinity of the heat-source side heat exchanger 12 (including turning ON/OFF), switching of the four-way valve 11 and the like and performs each operation mode, which will be described later. Also, the controller 60 controls the rotation number of a fan (including turning ON/OFF) installed in the vicinity of the use-side heat exchanger 26 mounted in the indoor unit 2.

Moreover, the controller 60 controls running of the pump 21 mounted in the relay unit 3, opening degrees of the expansion valves 16a to 16e, switching of the channel switching valve 22 and the channel switching valve 23, opening/closing of the stop valve 24, and switching of the flow control valve 25. That is, the controller 60 has functions as flow-rate control means that controls a flow rate of the heat medium in the relay unit 3, channel determining means that determines the channel of the heat medium, ON/OFF control means that performs turning ON/OFF of each device, and control target value changing means that changes a set target value as appropriate on the basis of information from each detecting means. The controller may be provided in each unit. In this case, it is preferable that the controllers can communicate with each other. Also, the controller is constituted by a microcomputer and the like.

In this air-conditioning apparatus 100, the compressor 10, the four-way valve 11, the heat-source side heat exchanger 12, the refrigerant channel of the first intermediate heat exchanger 15a, the refrigerant channel of the second intermediate heat exchanger 15b, and the accumulator 17 are connected by the refrigerant pipeline 4 through which the refrigerant flows so as to constitute a refrigeration cycle. Also, the heat medium channel of the first intermediate heat exchanger 15a, the first pump 21a, and the use-side heat exchanger 26 are connected in order by the pipeline 5a through which the heat medium flows so as to constitute a heat-medium circulation circuit for heating. Similarly, the heat-Medium channel of the second intermediate heat exchanger 15b, the second pump 21b, and the use-side heat exchanger 26 are connected in order in series by the pipeline 5b through which the heat medium flows so as to constitute a heat-medium circulation circuit for cooling. That is, a plurality of use-side heat exchangers 26 are connected in parallel to each of the intermediate heat exchangers 15 so as to have plural systems of the heat-medium circulation circuits. In the heat-medium circulation circuit for heating, a discharge valve 71a that discharges the heat medium from this heat-medium circulation circuit is disposed in the pipeline 5a. Also, in the heat-medium circulation circuit for cooling, a discharge valve 71b that discharges the heat medium from this heat-medium circulation circuit is disposed in the pipeline 5b.

That is, in the air-conditioning apparatus 100, the heat-source device 1 and the relay unit 3 are connected via the first intermediate heat exchanger 15a and the second intermediate heat exchanger 15b disposed in the relay unit 3, and the relay unit 3 and the indoor units 2 are connected by the first intermediate heat exchanger 15a and the second heat exchanger 15b. And the first intermediate heat exchanger 15a and the second intermediate heat exchanger 15b exchange heat between the heat-source side refrigerant, which is a primary-side refrigerant circulating through the refrigeration cycle, and the heat medium, which is a secondary-side refrigerant circulating through the heat-medium circulation circuit.

Here, the type of the refrigerant used in the refrigeration cycle and the heat medium circulation circuit will be described. In the refrigeration cycle, a zeotropic refrigerant mixture such as R407C and the like, a near-azeotropic refrigerant mixture such as R410A, R404A and the like, a single refrigerant such as R22, R134a and the like can be used. Also, natural refrigerants including carbon dioxide, hydrocarbon and the like can be used. By using a natural refrigerant as the heat-source side refrigerant, an advantage of suppressing a greenhouse effect of the earth caused by refrigerant leakage can be obtained. Particularly, since carbon dioxide exchanges heat without being condensed on the high-pressure side in a supercritical state, by setting the heat-source side refrigerant and the heat medium in a countercurrent format in the first intermediate heat exchanger 15a and the second intermediate heat exchanger 15b as shown in FIG. 2, heat exchange performance when the heat medium is heated or cooled can be improved.

The heat-medium circulation circuit is connected to the use-side heat exchanger 26 of the indoor unit 2 as described above. Thus, in the air-conditioning apparatus 100, use of a heat medium with high safety is assumed in consideration of leakage of the heat medium into a room where the indoor unit 2 is installed or the like. Therefore, as the heat medium, water, an anti-freezing fluid, a mixed solution of water and an anti-freezing fluid or the like, for example, can be used. According to this configuration, even if the refrigerant leaks from the pipeline, inflow of the leaking refrigerant into the room can be suppressed, whereby high reliability can be obtained. Also, if the indoor unit 2 is installed in a place were moisture should be avoided such as a computer room, a fluorine inactive liquid with high thermal insulation can be also used as the heat medium.

<Operation Mode of Air-Conditioning Apparatus 100>

Subsequently, each operation mode executed by the air-conditioning apparatus 100 will be described.

The air-conditioning apparatus 100 is capable of a cooling operation or a heating operation with the indoor units 2 thereof on the basis of an instruction from each indoor unit 2. More specifically, the air-conditioning apparatus 100 is capable of the same operation by all the indoor units 2 and of different operations by each of the indoor units 2. That is, the air-conditioning apparatus 100 according to this embodiment is an air-conditioning apparatus capable of the simultaneous operation of coding and heating. Four operation modes performed by the air-conditioning apparatus 100, that is, a cooling only operation mode in which all the running indoor units 2 perform the cooling operation, a heating only operation mode in which all the running indoor units 2 perform the heating operation, a cooling-main operation mode in which a cooling load is larger, and a heating-main operation in which a heating load is larger will be described below with a flow of the refrigerant.

(Cooling Only Operation Mode)

Figure 4:
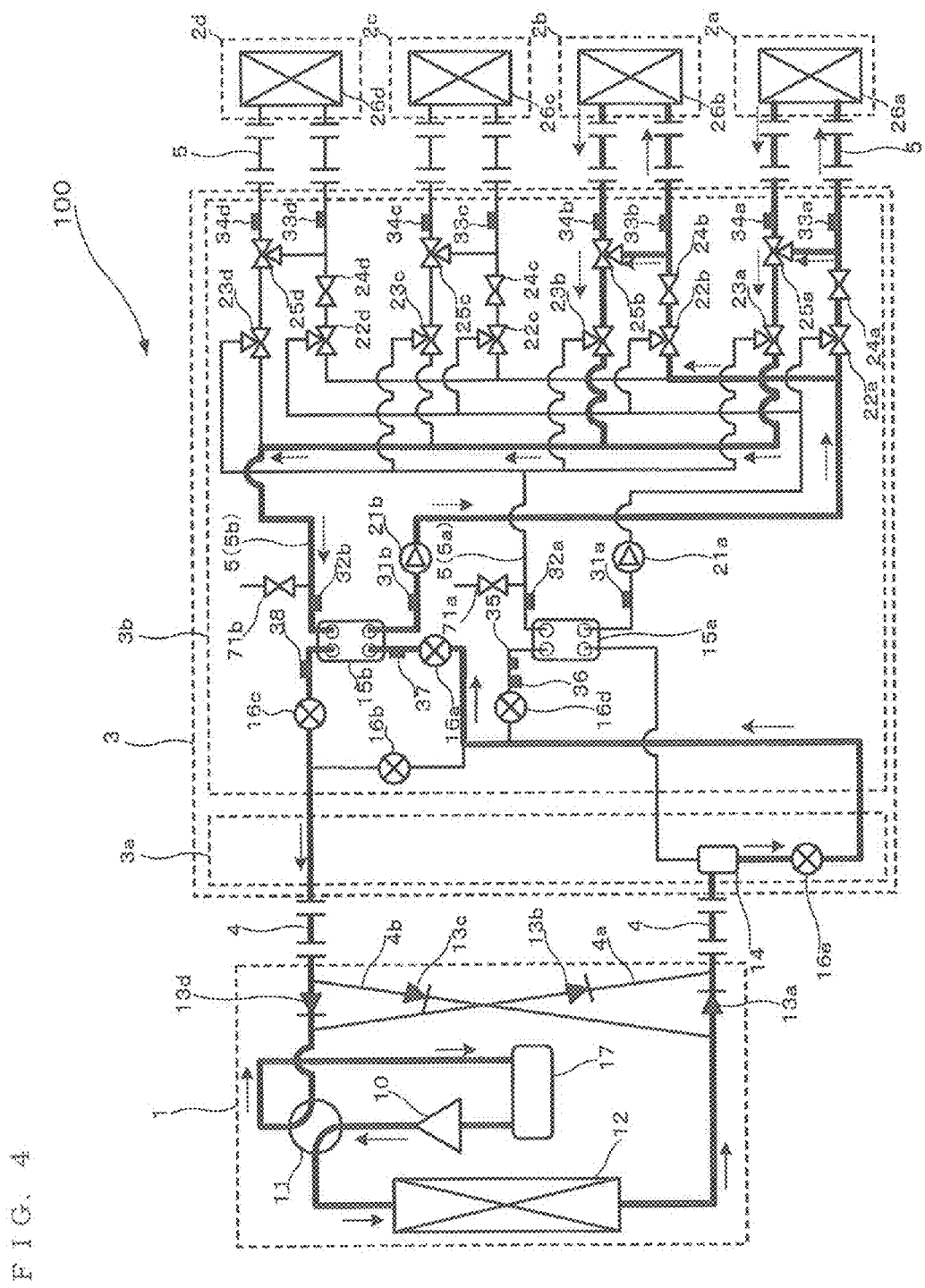
FIG. 4 is a refrigerant cycle diagram illustrating a flow of a refrigerant in a cooling only operation mode of the air-conditioning apparatus according to Embodiment 1.

FIG. 4 is a refrigerant cycle diagram illustrating a flow of a refrigerant in the cooling only operation mode of the air-conditioning apparatus 100, in FIG. 4, the cooling only operation mode will be described using an example in which a cooling load is generated only in the use-Side heat exchanger 26a and the use-side heat exchanger 26b. That is, in FIG. 4, the case in which the cooling bad is not generated in the use-side heat exchanger 26c and the use-side heat exchanger 26d is illustrated. In FIG. 4, a pipeline expressed by a bold line indicates a pipeline through which the refrigerant (the heat-source side refrigerant and the heat medium) circulates. Also, a flow direction of the heat-source side refrigerant is indicated by a solid-line arrow, while the flow direction of the heat medium by a broken-line arrow.

In the case of the cooling only operation mode shown in FIG. 4, in the heat source device 1, the four-way valve 11 is switched so that the heat-source side refrigerant discharged from the compressor 10 flows into the heat-source side heat exchanger 12. In the relay unit 3, the first pump 21a is stopped, the second pump 21b is run, and the stop valve 24a and the stop valve 24b are opened, while the stop valve 24c and the stop valve 24d are closed so that the heat medium circulates between the second intermediate heat exchanger 15b and each of the use-side heat exchangers 26 (use-side heat exchanger 26a and the use-side heat exchanger 26b). In this state, the operation of the compressor 10 is started.

First, the flow of the heat-source side refrigerant in the refrigeration cycle will be described.

A low-temperature low-pressure refrigerant is compressed by the compressor 10, becomes a high-temperature and high-pressure gas refrigerant and is discharged. The high-temperature and high-pressure gas refrigerant discharged from the compressor 10 passes through the four-way valve 11 and flows into the heat-source side heat exchanger 12. Then, the refrigerant is condensed and liquefied while transferring heat to the outdoor air in the heat source side heat exchanger 12 and becomes a high-pressure liquid refrigerant. The high-pressure liquid refrigerant having flowed out of the heat-source side heat exchanger 12 passes through the check valve 13a and flows out of the heat-source device 1 and flows into the first relay unit 3a via the refrigerant pipeline 4. The high-pressure liquid refrigerant having flowed into the first relay unit 3a flows into the gas-liquid separator 14 and then, passes through the expansion valve 16e and flows into the second relay unit 3b.

The refrigerant having flowed into the second relay unit 3b is throttled by the expansion valve 16a and expanded and becomes a low-temperature low-pressure gas-liquid two-phase refrigerant. This gas-liquid two-phase refrigerant flows into the second intermediate heat exchanger 15b working as an evaporator, and while taking heat away from the heat medium circulating in the heat-medium circulation circuit so as to cool the heat medium, the refrigerant becomes the low-temperature low-pressure gas refrigerant. The gas refrigerant having flowed out of the second intermediate heat exchanger 15b passes through the expansion valve 16c, flows out of the second relay unit 3b and the first relay unit 3a and flows into the heat-source device 1 via the refrigerant pipeline 4. The refrigerant having flowed into the heat-source device 1 passes through the check valve 13d and is sucked into the compressor 10 again via the four-way valve 11 and the accumulator 17. The expansion valve 16b and the expansion valve 16d have small opening degrees so that the refrigerant does not flow therethrough, while the expansion valve 115c is in the fully open state so that a pressure loss does not occur.

Subsequently, the flow of the heat medium in the heat-medium circulation circuit will be described.

In the cooling only operation mode, since the first pump 21a is stopped, the heat medium circulates through the pipeline 5b. The heat medium having been cooled by the heat-source side refrigerant in the second intermediate heat exchanger 15b is fluidized in the pipeline 5b by the second pump 21b. The heat medium having been pressurized and flowed out by the second pump 21b passes through the stop valve 24 (the stop valve 24a and the stop valve 24b) via the channel switching valve 22 (the channel switching valve 22a and the channel switching valve 22b) and flows into the use-side heat exchanger 26 (the use-side heat exchanger 26a and the use-side heat exchanger 26b). Then, the refrigerant takes heat away from the indoor air in the use-side heat exchanger 26 and cools a region to be air-conditioned such as the inside of the room where the indoor unit 2 is installed.

After that, the heat medium having flowed out of the use-side heat exchanger 26 flows into the flow control valve 25 (the flow control valve 25a and the flow control valve 25b). At this time, by means of the action of the flow control valve 25, the heat medium only in a flow rate required to cover an air-conditioning load required in the region to be air-conditioned such as the inside of the room flows into the use-side heat exchanger 26, while the remaining heat medium flows so as to bypass the use-side heat exchanger 26 via the bypass 27 (the bypass 27a and the bypass 27b).

The heat medium passing through the bypass 27 does not contribute to the heat exchange but merges with the heat medium having passed through the use-side heat exchanger 26, passes through the channel switching valve 23 (the channel switching valve 23a and the channel switching valve 23b), flows into the second intermediate heat exchanger 15b and is sucked into the second pump 21 again. The air-conditioning load required in the region to be air-conditioned such as the inside of the room can be covered by means of control such that a temperature difference between the third temperature sensor 33 and the fourth temperature sensor 34 is kept at a target value.

At this time, since there is no need to make the heat medium flow into the use-side heat exchanger 26 (including thermo off) which does not have an air-conditioning load, the channel is closed by the stop valve 24 so that the heat medium does not flow into the use-side heat exchanger 26, in FIG. 4, since there is an air-conditioning load in the use-side heat exchanger 26a and the use-side heat exchanger 26b, the heat medium is made to flow, but there is no air-conditioning load in the use-side heat exchanger 26c and the use-side heat exchanger 26d, and the corresponding stop valve 24c and the stop valve 24d are in the closed state. In the case of occurrence of a cooling load from the use-side heat exchanger 26c or the use-side heat exchanger 26d, it is only necessary to open the stop valve 24c or the stop valve 24d so that the heat medium is circulated.

(Heating Only Operation Mode)

Figure 5:
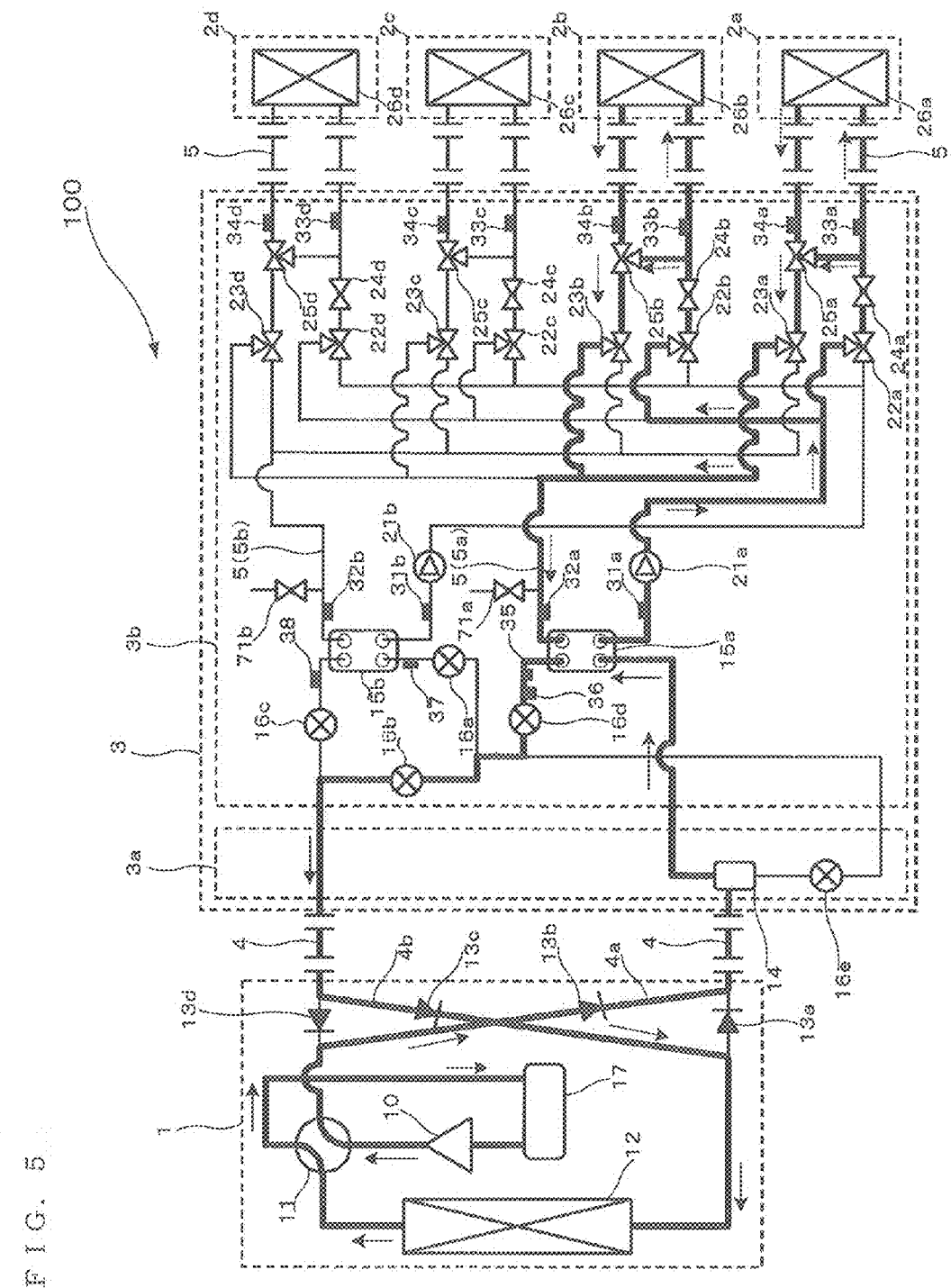
FIG. 5 is a refrigerant cycle diagram illustrating a flow of a refrigerant in a heating only operation mode of the air-conditioning apparatus according to Embodiment 1.

FIG. 5 is a refrigerant cycle diagram illustrating the flow of the refrigerant in the heating only operation mode of the air-conditioning apparatus 100. In FIG. 5, the heating only operation rode will be described using the case in which a heating load is generated only in the use-side heat exchanger 26a and the use-side heat exchanger 26b as an example. That is, in FIG. 5, the case in which the heating load it not generated in the use-side heat exchanger 26c and the use-side heat exchanger 26d is shown. In FIG. 5, the pipeline expressed by a bold line indicates a pipeline through which the refrigerant (heat-source side refrigerant and the heat medium) circulates. Also, the flow direction of the heat-source side refrigerant is indicated by a solid-line arrow, while the flow direction of the heat medium by a broken-line arrow.

In the case of the heating only operation mode shown in FIG. 5, in the heat-source device 1, the four-way valve 11 is switched so that the heat-source side refrigerant discharged from the compressor 10 flows into the relay unit 3 without going through the heat-source side heat exchanger 12. In the relay unit 3, the switching is made so that the first pump 21a is run, the second pump 21b is stooped, the stop valve 24a and the stop valve 24b are opened, and the stop valve 24c and the stop valve 24d are dosed so that the heat medium circulates between the first intermediate heat exchanger 15a and each use-side heat exchanger 26 (the use-side heat exchanger 26a and the use-side heat exchanger 26b). In this state, the operation of the compressor 10 is started.

First, the flow of the heat-source side refrigerant in the refrigeration cycle will be described.

A low-temperature low-pressure refrigerant is compressed by the compressor 10, becomes a high-temperature and high-pressure gas refrigerant and is discharged. The high-temperature and high-pressure gas refrigerant discharged from the compressor 10 passes through the four-way valve 11, is guided through the first connection pipeline 4a, passes through the check valve 13b and flows out of the heat-source device 1. The high-temperature and high-pressure gas refrigerant having flowed out of the heat-source device 1 flows into the first relay unit 3a through the refrigerant pipeline 4. The high-temperature and high-pressure gas refrigerant having flowed into the first relay unit 3a flows into the gas-liquid separator 14 and then, flows into the first intermediate heat exchanger 15a The high-temperature and high-pressure gas refrigerant having flowed into the first intermediate heat exchanger 15a is condensed and liquefied while transferring heat to the heat medium circulating through the heat-medium circulation circuit and becomes a high-pressure liquid refrigerant.

The high-pressure liquid refrigerant having flowed out of the first intermediate heat exchanger 15a is throttled by the expansion valve 16d and expanded and brought into a low-temperature low-pressure gas-liquid two-phase state. The refrigerant in the gas-liquid two-phase state having been throttled by the expansion valve 16d passes through the expansion valve 16b, is guided through the refrigerant pipeline 4 and flows into the heat-source device 1 again. The refrigerant having flowed into the heat-source device 1 passes through the second connection pipeline 4b via the check valve 13c and flows into the heat-source side heat exchanger 12 working as an evaporator. Then, the refrigerant having flowed into the heat-source side heat exchanger 12 takes heat away from the outdoor air in the heat-source side heat exchanger 12 so as to become a low-temperature low-pressure gas refrigerant. The low-temperature low-pressure gas refrigerant having flowed out of the heat-source side heat exchanger 12 returns to the compressor 10 via the four-way valve 11 and the accumulator 17. The expansion valve 16a, the expansion valve 16c, and the expansion valve 16e have small opening degrees so that the refrigerant does not flow therethrough.

Subsequently, the flow of the heat medium in the heat-medium circulation circuit will be described.

In the heating only operation mode, since the second pump 21b is stopped, the heat medium circulates through the pipeline 5a. The heat medium having been heated by the heat-source side refrigerant in the first intermediate heat exchanger 15a is fluidized in the pipeline 5a by the first pump 21a. The heat medium having been pressurized by the first pump 21a and flowed out passes through the stop valve 24 (the stop valve 24a and the stop valve 24b) via the channel switching valve 22 (the channel switching valve 22a and the channel switching valve 22b) and flows into the use-side heat exchanger 26 (the use-side heat exchanger 26a and the use-side heat exchanger 26b). Then, the heat medium gives heat to the indoor air in the use-side heat exchanger 26 and heats the region to be air-conditioned such as the inside of the room where the indoor unit 2 is installed.

After that, the heat medium having flowed out of the use-side heat exchanger 26 flows into the flow control valve 25 (the flow control valve 25a and the flow control valve 25b). At this time, by means of the action of the flow control valve 25, the heat medium only in a flow rate required to cover an air-conditioning load required in the region to be air-conditioned such as the inside of the room flows into the use-side heat exchanger 26, while the remaining heat medium flows so as to bypass the use-side heat exchanger 26 through the bypass 27 (the bypass 27a and the bypass 27b).

The heat medium passing through the bypass 27 does not contribute to the heat exchange but merges with the heat medium having passed through the use side heat exchanger 26, passes through the channel switching valve 23 (the channel switching valve 23a and the channel switching valve 23b), flows into the first intermediate heat exchanger 15a and is sucked into the first pump 21a again. The air-conditioning load required in the region to be air-conditioned such as the inside of the room can be covered by means of control such that a temperature difference between the third temperature sensor 33 and the fourth temperature sensor 34 is kept at a target value.

At this time, since there is no need to make the heat medium flow into the use-side heat exchanger 26 (including thermo off) which does not have an air-conditioning load, the channel is closed by the stop valve 24 so that the heat medium does not flow into the use-side heat exchanger 26. In FIG. 5, since there is an air-conditioning load in the use-side heat exchanger 26a and the use-side heat exchanger 26b, the heat medium is made to flow, but there is no air-conditioning load in the use-side heat exchanger 26c and the use-side heat exchanger 26d, and the corresponding stop valve 24c and the stop valve 24d are in the closed state. In the case of occurrence of a heating load from the use-side heat exchanger 26c or the use-side heat exchanger 26d, it is only necessary to open the stop valve 24c or the stop valve 24d so that the heat medium is circulated.

(Cooling-Main Operation Mode)

Figure 6:
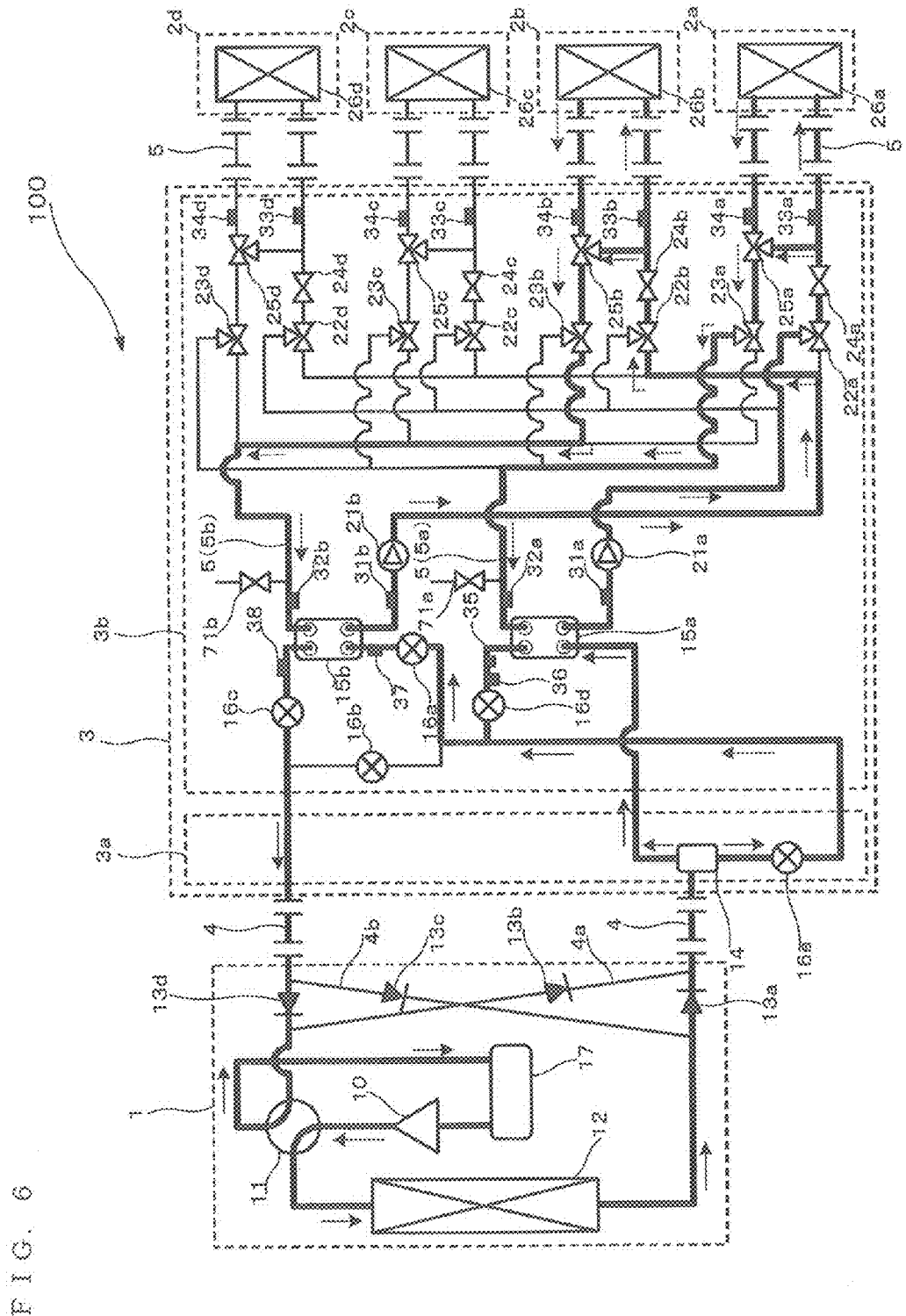
FIG. 6 is a refrigerant cycle diagram illustrating a flow of a refrigerant in a cooling-main operation mode of the air-conditioning apparatus according to Embodiment 1.

FIG. 6 is a refrigerant cycle diagram illustrating the flow of the refrigerant during the cooling-main operation mode of the air-conditioning apparatus 100. In FIG. 6, using a case in which a heating load is generated in the use-side heat exchanger 26a and a cooling load is generated in the use-side heat exchanger 26b as an example, the cooling-main operation mode will be described. That is, in FIG. 6, the case in which neither of the heating load no the cooling load is generated in the use-side heat exchanger 26c and the use-side heat exchanger 26d is shown. In FIG. 6, the pipeline expressed by a bold line indicates a pipeline through which the refrigerant (heat-source site refrigerant and the heat medium) circulates. Also, the flow direction of the heat-source side refrigerant is indicated by a solid-line arrow, while the flow direction of the heat medium by a broken-line arrow.

In the case of the cooling-main operation mode shown in FIG. 6, in the heat-source device 1, the four-way valve 11 is switched so that the heat-source side refrigerant discharged from the compressor 10 flows into the heat-source side heat exchanger 12. In the relay unit 3, the first pump 21a and the second pump 21b are run, the stop valve 24a and the stop valve 24b are opened, the stop valve 24c and the stop valve 24d are closed, and the heat medium is made to circulate between the first intermediate heat exchanger 15a and the use-side heat exchanger 26a as well as between the second intermediate heat exchanger 15b and the use-side heat exchanger 26b. In this state, the operation of the compressor 10 is started.

First, the flow of the heat-source side refrigerant in the refrigeration cycle will be described.

The low-temperature low-pressure refrigerant is compressed by the compressor 10 and discharged as the high-temperature and high-pressure gas refrigerant. The high-temperature and high-pressure gas refrigerant discharged from the compressor 10 passes through the four-way valve 11 and flows into the heat-source side heat exchanger 12. Then, the refrigerant is condensed while transferring heat to the outdoor air in the heat-source side heat exchanger 12 and becomes a gas-liquid two-phase refrigerant. The gas-liquid two-phase refrigerant having flowed out of the heat-source side heat exchanger 12 flows out of the heat-source device 1 via the check valve 13a and flows into the first relay unit 3a via the refrigerant pipeline 4. The gas-liquid two-phase refrigerant having flowed into the first relay unit 3a flows into the gas-liquid separator 14 and is separated into a gas refrigerant and a liquid refrigerant, which flow into the second relay unit 3b.

The gas refrigerant having been separated in the gas-liquid separator 14 flows into the first intermediate heat exchanger 15a. The gas refrigerant having flowed into the first intermediate heat exchanger 15a is condensed and liquefied while transferring heat to the heat medium circulating through the heat-medium circulation circuit and becomes a liquid refrigerant. The liquid refrigerant having flowed out of the second intermediate heat exchanger 15b passes through the expansion valve 16d. On the other hand, the liquid refrigerant separated in the gas-liquid separator 14 passes through the expansion valve 16e, is condensed and liquefied in the first intermediate heat exchanger 15a but merges with the liquid refrigerant having passed through the expansion valve 16d, is throttled by the expansion valve 16a and expanded and flows into the second intermediate heat exchanger 15b as the low-temperature low-pressure gas-liquid two-phase refrigerant.

This gas-liquid two-phase refrigerant takes heat away from the heat medium circulating through the heat-medium circulation circuit in the second intermediate heat exchanger 15b working as an evaporator so as to cool the heat medium and becomes a low-temperature low-pressure gas refrigerant. The gas refrigerant having flowed out of the second intermediate heat exchanger 15b passes through the expansion valve 16c and then, flows out of the second relay unit 3b and the first relay unit 3a to flow into the heat-source device 1 via the refrigerant pipeline 4. The refrigerant having flowed into the heat-source device 1 passes through the check valve 13d to be sucked into the compressor 10 nein via the four-way valve 11 and the accumulator 17. The expansion valve 16b has a small opening degree so that the refrigerant does not flow therethrough, while the expansion valve 16c is in the full open state so that no pressure loss occurs.

Subsequently, the flow of the heat medium in the heat-medium circulation circuit will be described.

In the cooling-main operation mode, since the first pump 21a and the second pump 21b are both run, the heat medium is circulated through both the pipeline 5a and the pipeline 5b. The heat medium heated by the heat-source side refrigerant in the first intermediate heat exchanger 15a is fluidized in the pipeline 5a by the first pump 21a. Also, the heat medium cooled by the heat-source side refrigerant in the second intermediate heat exchanger 15b is fluidized in the pipeline 5b by the second pump 21b.

The heat medium having been pressurized by the first pump 21a and flowed out passes through the stop valve 24a via the channel switching valve 22a and flows into the use-side heat exchanger 26a. Then, in the use-side heat exchanger 26a, the heat medium gives heat to the indoor air and heats the region to be air-conditioned such as the inside of the room where the indoor unit 2 is installed. Also, the heat medium having been pressurized by the second pump 21b and flowed out passes through the stop valve 24b via the channel switching valve 22b and flows into the use heat exchanger 26b. Then, in the use-side heat exchanger 26b, the heat medium takes heat away from the indoor air and cools the region to be air-conditioned such as the inside of the room where the indoor unit 2 is installed.

The heat medium having performed heating flows into the flow control valve 25a. At this time, by means of the action of the flow control valve 25a, the heat medium only in a flow rate required to cover an air-conditioning load required in the region to be air-conditioned flows into the use-side heat exchanger 26a, while the remaining heat medium flows so as to bypass the use-side heat exchanger 29a via the bypass 27a. The heat medium passing through the bypass 27a does not contribute to heat exchange but merges with the heat medium having passed through the use-side heat exchanger 26a, flows into the first intermediate heat exchanger 15a through the channel switching valve 23a and is sucked into the first pump 21a again.

Similarly, the heat medium having performed cooling flows into the flow control valve 25b. At this time, by means of the action of the flow control valve 25b, the heat medium only in a flow rate required to cover an air-conditioning load required in the region to be air-conditioned flows into the use-side heat exchanger 26b, while the remaining heat medium flows so as to bypass the use-side heat exchanger 26b via the bypass 27b. The heat medium passing through the bypass 27b does not contribute to heat exchange but merges with the heat medium having passed through the use-side heat exchanger 26b, flows into the second intermediate heat exchanger 15b via the channel switching valve 23b and is sucked into the second pump 21b again.

During that period, the hot heat medium (the heat medium used for the heating load) and the cold heat medium (the heat medium used for the cooling load) flow into the use-side heat exchanger 26a which has the heating load or the use-side heat exchanger 26b which has the cooling load without mixing by means of the actions of the channel switching valve 22 (the channel switching valve 22a and the channel switching valve 22b) and the channel switching valve 23 (the channel switching valve 23a and the channel switching valve 23b). The air conditioning load required in the region to be air-conditioned such as the inside of the room can be covered by executing control such that a difference in temperatures between the third temperature sensor 33 and the fourth temperature sensor 34 is kept at a target value.

At this time, since there is no need to make the heat medium flow into the use-side heat exchanger 26 (including thermo off) which does not have an air-conditioning load, the channel is closed by the stop valve 24 so that the heat medium does not flow into the use-side heat exchanger 26. In FIG. 6, the heat medium is made to flow due to an air-conditioning load existing in the use-side heat exchanger 26a and the use heat exchanger 26b, however, no air-conditioning load exist in the use-side heat exchanger 26c and the use-side heat exchanger 26d, and the corresponding stop valve 24c and the stop valve 24d are in the closed state. In the case of occurrence of a hey tin load or occurrence of a cooling load in the use-side heat exchanger 26c or the use-side heat exchanger 26d, it is only necessary to open the stop valve 24c or the stop valve 24d so that the heat medium is circulated.

(Heating-Main Operation Mode)

Figure 7:
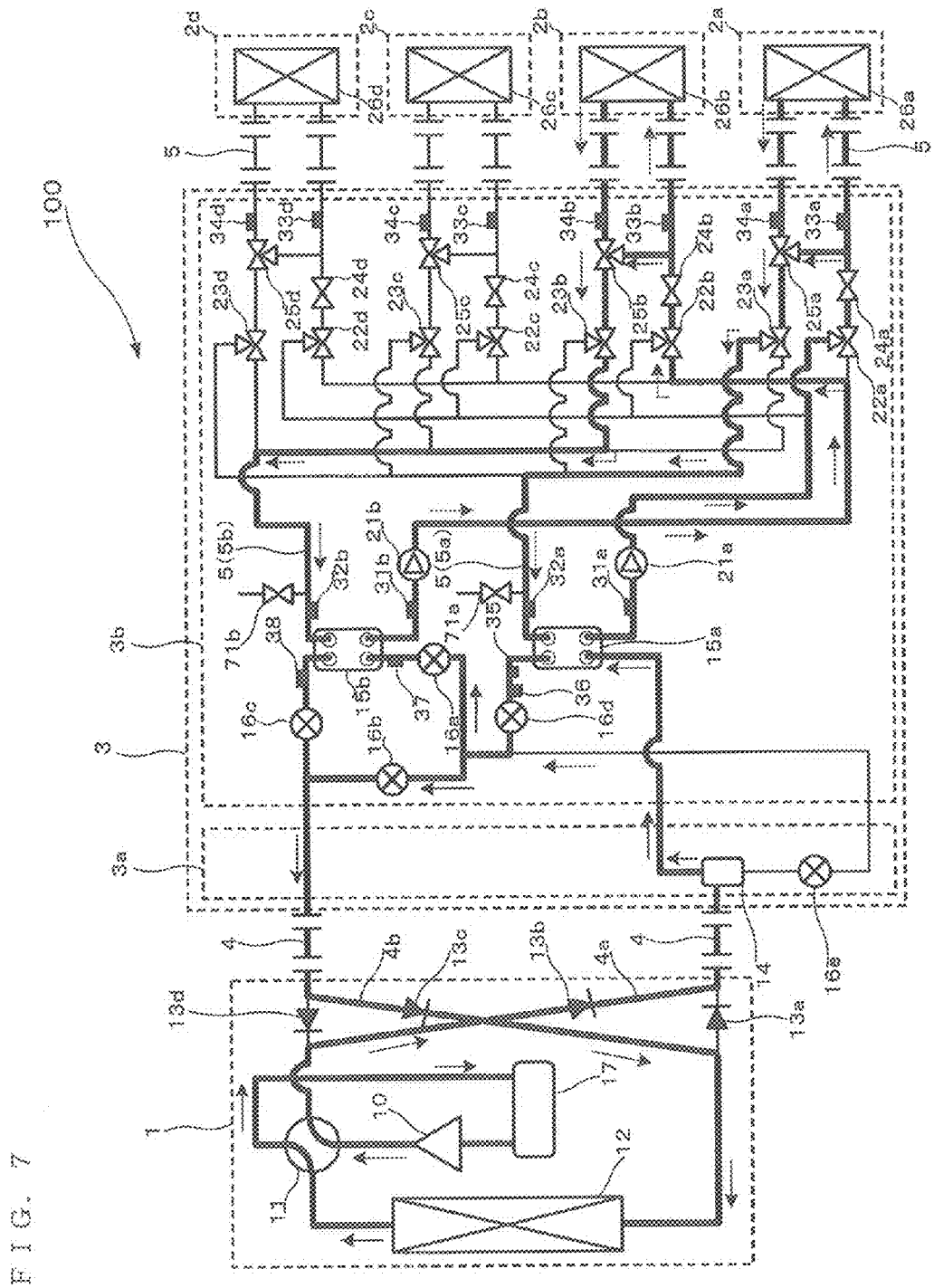
FIG. 7 is a refrigerant cycle diagram illustrating a flow of a refrigerant in a heating-main operation mode of the air-conditioning apparatus according to Embodiment 1.

FIG. 7 is a refrigerant cycle diagram illustrating the flow of the refrigerant during the heating-main operation mode of the air-conditioning apparatus 100. In FIG. 7, by using a case in which a heating load is generated in the use-side heat exchanger 26a and a cooling load is generated in the use-side heat exchanger 26b as an example, the heating-main operation mode will be described. That is, in FIG. 7, the case in which neither of the heating load nor the cooling load is generated in the use-side heat exchanger 26c and the use-side heat exchanger 26d is shown. In FIG. 7, the pipeline expressed by a bold line indicates a pipeline through which the refrigerant (heat-source side refrigerant and the heat medium) circulates. Also, the flow direction of the heat-source side refrigerant is indicated by a solid-line arrow, while the flow direction of the heat medium by a broken-line arrow.

In the case of the heating-main operation mode shown in FIG. 7, in the heat source device 1, the four-way valve 11 is switched so that the heat-source side refrigerant discharged from the compressor 10 flows into the relay unit 3 without passing through the heat-source side heat exchanger 12. In the relay unit 3, the first pump 21a and the second pump 21b are run, the stop valve 24a and the stop valve 24b are opened, the stop valve 24c and the stop valve 24d are closed, and the heat medium is made to circulate between the first intermediate heat exchanger 15a and the use-side heat exchanger 26a as well as between the second intermediate heat exchanger 15b and the use-side heat exchanger 26b. In this state, the operation of the compressor 10 is started.

First, the flow of the heat-source side refrigerant in the refrigeration cycle will be described.

The low-temperature low-pressure refrigerant is compressed by the compressor 10 and becomes a high-temperature and high-pressure gas refrigerant and is discharged. The high-temperature and high-pressure gas refrigerant discharged from the compressor 10 passes through the four-way valve 11, is guided through the first connection pipeline 4a, passes through the check valve 13b and flows out of the heat-source device 1. The high-temperature and high-pressure gas refrigerant having flowed out of the heat-source device 1 flows into the first relay unit 3a via the refrigerant pipeline 4. The high-temperature and high-pressure gas refrigerant having flowed into the first relay unit 3a flows into the gas-liquid separator 14 and then, flows into the first intermediate heat exchanger 15a. The high-temperature and high-pressure gas refrigerant having flowed into the first intermediate heat exchanger 15a is condensed and liquefied while transferring heat to the heat medium circulating through the heat-medium circulation circuit and becomes a high-pressure liquid refrigerant.

The high-pressure liquid refrigerant having flowed out of the first intermediate heat exchanger 15a is throttled by the expansion valve 16d and expanded and brought into a low-temperature low-pressure gas-liquid two-phase state. The refrigerant in the gas-liquid two-phase state having been throttled by the expansion valve 16d is divided into a channel through the expansion valve 16a and a channel through the expansion valve 16b. The refrigerant having passed through the expansion valve 16a is further expanded by this expansion valve 16a and becomes a low-temperature low-pressure gas-liquid two-phase refrigerant and flows into the second intermediate heat exchanger 15b working as an evaporator. The refrigerant having flowed into the second intermediate heat exchanger 15b takes heat away from the heat medium in the second intermediate heat exchanger 15b and becomes a low-temperature low-pressure gas refrigerant. The low-temperature low-pressure gas refrigerant, having flowed out of the second intermediate heat exchanger 15b passes through the expansion valve 16c.

On the other hand, the refrigerant having been throttled by the expansion valve 16d and flowed to the expansion valve 16b merges with the refrigerant having passed through the second intermediate heat exchanger 15b and the expansion valve 16c to become a low-temperature low-pressure refrigerant with larger dryness. Then, the merged refrigerant flows out of the second relay unit 3b and the first relay unit 3a to flow into the heat-source device 1 through the refrigerant pipeline 4. Then, the refrigerant having flowed into the heat-source device 1 passes through the second connection pipeline 4b via the check valve 13c to flow into the heat-source side heat exchanger 12 working as an evaporator. The refrigerant having flowed into the heat-source side heat exchanger 12 takes heat away from the outdoor air in the heat-source side heat exchanger 12 to become a low-temperature low-pressure gas refrigerant. The low-temperature low-pressure gas refrigerant having flowed out of the heat-source side heat exchanger 12 returns to the compressor 10 through the four-way valve 11 and the accumulator 17. The expansion valve 16e has a small opening degree so that the refrigerant does not flow therethrough.

Subsequently, the flow of the heat medium in the heat-medium circulation circuit will be described.

In the heating-main operation mode, since the first pump 21a and the second pump 21b are both run, the heat medium is circulated through both the pipeline 5a and the pipeline 5b. The heat medium heated by the heat-source side refrigerant in the first intermediate heat exchanger 15a is fluidized in the pipeline 5a by the first pump 21a. Also, the heat medium cooled by the heat-source side refrigerant in the second intermediate heat exchanger 15b is fluidized in the pipeline 5b by the second pump 21b.

The heat medium having been pressurized by the first pump 21a and flowed out passes through the stop valve 24a via the channel switching valve 22a and flows into the use-side heat exchanger 26a. Then, in the use-side heat exchanger 26a, the heat medium gives heat to the indoor air and heats the region to be air-conditioned such as the inside of the room where the indoor unit 2 is installed. Also, the heat medium having been pressurized by the second pump 21b and flowed out passes through the stop valve 24b via the channel switching valve 22b and flows into the use-side heat exchanger 26b. Then, in the use-side heat exchanger 26b, the heat medium takes heat away from the indoor air and cools the region to be air-conditioned such as the inside of the room where the indoor unit 2 is installed.

The heat medium having flowed out of the use heat exchanger 26a flows into the flow control valve 25a. At this time, by means of the action of the flow control valve 25a, the heat medium only in a flow rate required to cover an air-conditioning load required in the region to be air-conditioned such as the inside of a room flows into the use-side heat exchanger 26a, while the remaining heat medium flows so as to bypass the use-side heat exchanger 26a through the bypass 27a. The heat medium passing through the bypass 27a does not contribute to heat exchange but merges with the heat medium having passed through the use-side heat exchanger 26a, flows into the first intermediate heat exchanger 15a through the channel switching valve 23a and is sucked into the first pump 21a again.

Similarly, the heat medium having flowed out of the use-side heat exchanger 26b flows into the flow control valve 25b. At this time, by means of the action of the flow control valve 25b, the heat medium only in a flow rate required to cover an air-conditioning load required in the region to be air-conditioned such as the inside of the room flows into the use-side heat exchanger 26b, while the remaining heat medium flows so as to bypass the use-side heat exchanger 26b through the bypass 27b. The heat medium passing through the bypass 27b does not contribute to heat exchange but merges with the heat medium having passed through the use side heat exchanger 26b, flows into the second intermediate heat exchanger 15b through the channel switching valve 23b and is sucked into the second pump 21b again.

During that period, the hot heat medium and the cold heat medium flow into the use-side heat exchanger 26a which has the heating load or the use-side heat exchanger 26b which has the cooling load without mixing by means of the actions of the channel switching valve 22 (the channel switching valve 22a and the channel switching valve 22b) and the channel switching valve 23 (the channel switching valve 23a and the channel switching valve 23b). The air-conditioning load required in the region to be air-conditioned such as the inside of the room can be covered by executing control such that a difference in temperatures between the third temperature sensor 33 and the fourth temperature sensor 34 is kept at a target value.

At this time, since there is no need to make the heat medium flow into the use-side heat exchanger 26 (including thermo off) not having an air-conditioning load, the channel is closed by the stop valve 24 so that the heat medium does not flow into the use-side heat exchanger 26. In FIG. 7, the heat medium is made to flow due to an air-conditioning load in the use-side heat exchanger 26a and the use-side heat exchanger 26b, however no air-conditioning bad exists in the use-side heat exchanger 26c and the use-side heat exchanger 26d, and the corresponding stop valve 24c and the stop valve 24d are in the closed state. In the case of occurrence of a heating load or occurrence of a cooling bad from the use-side heat exchanger 26c or the use-side heat exchanger 26d, it is only necessary to open the stop valve 24c or the stop valve 24d so that the heat medium is circulated.

(Leakage Detection of Heat Medium)

If a heat medium leaks from the heat-medium circulation circuit of the air-conditioning apparatus 100, this leaking heat medium might intrude into the living space 7 or the like. The heat medium such as water, an anti-freezing fluid and the like having intruded into the living space 7 or the like might pollute the indoor environment though does not negatively affect human bodies much. Thus, in order to suppress the pollution of the indoor environment such as the living space 7 or the like, the air-conditioning apparatus 100 according to Embodiment 1 detects leakage of the heat medium from the heat-medium circulation circuit as follows.

Figure 8:
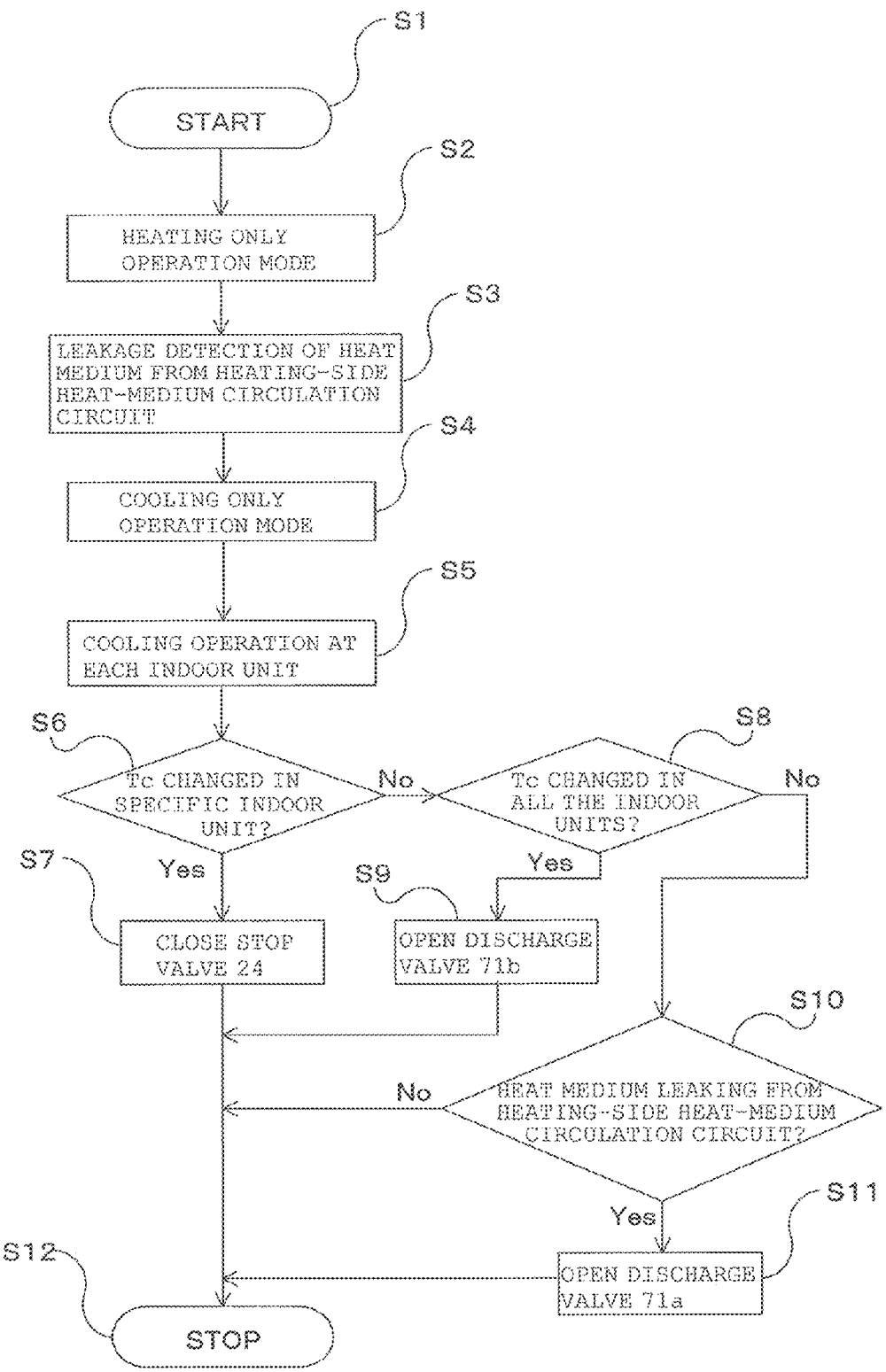
FIG. 8 is a flowchart illustrating an example of a method of detecting leakage of a heat medium according to Embodiment 1.

FIG. 8 is a flowchart illustrating an example of a heat-medium leakage detecting method according to Embodiment 1 of the present invention.

When a heat-medium leakage detection process is started (Step S1), the controller 60 puts the air-conditioning apparatus 100 into the heating only operation mode (Step S2). And the controller controls the opening degree of the flow control valve 25 and the air amount of the fan of the indoor unit 2 to values determined in advance. As a result, a heating load (air-conditioning load) of the use-side heat exchanger 26 can be controlled to a load determined in advance. In this state, the routine goes to Step S3.

At Step S3, it is determined whether the heat medium is leaking from the heat medium circuit for heating or not. In Embodiment 1, whether or not the heat medium is leaking from the heat-medium circulation circuit for heating is determined by whether a detected temperature (the temperature of the heat medium flowing out of the use-side heat exchanger 26) Th of the fourth temperature sensor 34 is larger than a threshold value T1 or not. Here, the fourth temperature sensor 34 corresponds to the heat-medium temperature detection portion of the present invention. If the heat medium is not leaking from the heat-medium circulation circuit for heating, for example, the detected temperature Th of the fourth temperature sensor 34 is close to a certain temperature. However, if the heat medium is leaking from the heat-medium circulation circuit for heating, since the amount of the heat medium flowing into the use-side heat exchanger 26 is decreased, the detected temperature Th of the fourth temperature sensor 34 is lowered. Thus, if the detected temperature of the fourth temperature sensor 34 (the temperature of the heat medium flowing out of the use-side heat exchanger 26) Th falls under the threshold value T1, it is determined that the heat medium is leaking from the heat medium circuit for heating. Then, the routine goes to Step S4. Whether or not the heat medium is leaking from the heat medium circuit for heating may be determined on the basis of a lowered amount of the detected temperature Th during leakage detection. That is, the leakage of the heat medium can be detected on the basis of a change amount of the detected temperature Th from a specific value.

At Step S4, the air-conditioning apparatus 100 is put into the cooling only operation mode. And the opening degree of the flow control valve 25 and the air amount of the fan of the indoor unit 2 are controlled to values determined in advance. As a result the cooling load (air-conditioning load) of the use-side heat exchanger 26 can be controlled to the load determined in advance, in this state, the routine goes to Step S5.

At Step S5, the cooling operation is performed for each indoor unit 2. That is, the heat medium is made to flow into each of the use-side heat exchangers 26 one by one. Then, a temperature Tc of the heat medium flowing out of the use-side heat exchanger 26 during the cooling operation is detected by the fourth temperature sensor 34. If the heat medium is not leaking from the heat-medium circulation circuit for cooling, for example, the detected temperature Tc of the fourth temperature sensor 34 is close to a certain temperature. However, if the heat medium is leaking from the heat-medium circulation circuit for cooling, since the amount of the heat medium flowing into the use-side heat exchanger 26 is decreased, the detected temperature Tc of the fourth temperature sensor 34 is raised.

When the cooling operation of all the indoor units 2 (the indoor unit 2a to the indoor unit 2d) is finished, the routine goes to Step S6.

At Step S6, it is determined whether the detected temperature Tc of the fourth temperature sensor 34 has been raised during the cooling operation of the specific indoor unit 2 or not. If the detected temperature Tc of the fourth temperature sensor 34 has been raised during the cooling operation of the specific indoor unit 2, it is determined that the heat medium is leaking from this indoor unit 2 side (between the use-side heat exchanger 26 and the stop valve 24 of this indoor unit 2 and between the use-side heat exchanger 26 and the flow control valve 25 of this indoor unit 2). Then, the routine goes to Step S7, and the stop valve connected to the use-side heat exchanger 26 of this indoor unit 2 is closed. After that, the routine goes to Step S12, where the leakage detection of the heat medium is finished. Here, the stop valve 24 corresponds to an opening/closing device of the present invention.

On the other hand, if there is no change in the raised amount of the detected temperature Tc during the cooling operation of each indoor unit 2, the routine goes to Step S8.

At Step S8, it is determined whether the detected temperature Tc of the fourth temperature sensor 34 has been raised during the cooling operations of all the indoor units 2 or not. If the detected temperature Tc of the fourth temperature sensor 34 has been raised during the cooling operations of all the indoor units 2, it is determined that the heat medium is leaking from the intermediate unit side of the heat-medium circulation circuit for refrigerant (the pipeline on the upstream side rather than the stop valve 24 and the pipeline on the downstream side rather than the flow control valve 25), and the routine goes to Step S9. Then, the discharge valve 71b is opened, and the heat medium in the heat-medium circulation circuit for refrigerant is discharged. After that, the routine goes to Step S12, where the leakage detection of the heat medium is finished. Here, the discharge valve 71b corresponds to the heat medium discharge portion of the present invention.

If the detected temperature Tc of the fourth temperature sensor 34 has not changed during the cooling operations of all the indoor units 2, the routine goes to Step S10. Then, if it is determined at Step S3 that no heat medium is leaking from the heat-medium circulation circuit for heating, the routine goes to Step S12, and the leakage detection of the heat medium is finished. Also, if it is determined at Step S3 that the heat medium is leaking from the heat-medium circulation circuit for heating, the routine goes to Step S11. Then, the discharge valve 71a is opened, and the heat medium in the heat medium circulation circuit for heating is discharged. After that, the routine goes to Step S12, where the leakage detection of the heat medium is finished. Here, the discharge valve 71a corresponds to the heat medium discharge portion of the present invention.

If the heat medium is leaking from the specific indoor unit 2 side after the leakage detection process of the heat medium is finished, the indoor units 2 other than this indoor unit 2 performs a usual operation. Also, if the heat medium is leaking from the intermediate unit side of the heating-side heat-medium circulation circuit, the heating operation is prohibited. Also, if the heat medium is leaking from the intermediate unit side of the cooling-side heat-medium circulation circuit, the cooling operation is prohibited.

As described above, in the air-conditioning apparatus 100 configured as above, on the basis of the temperature of the heat medium flowing out of the use-side heat exchanger 26, leakage of the heat medium from the heat-medium circulation circuit can be detected.

Also, by allowing the heat medium to flow into the use-side heat exchangers 26 one by one, a leakage spot of the heat medium can be grasped.

Also, if the heat medium is leaking from the indoor unit 2 side, by closing the stop valve 24 connected to the use-side heat exchanger 26 of this indoor unit 2, the leakage of the heat medium can be suppressed.

Also, if the heat medium is leaking from the intermediate unit side of the heat-medium circulation circuit, by discharging the heat medium from the discharge valve (the discharge valve 71a and the discharge valve 71b) disposed in the heat-medium circulation circuit from which the heat medium is leaking, the leakage of the heat medium can be suppressed.

In Embodiment 1, leakage of the heat medium from the heat-medium circulation circuit for heating is determined based on whether or not the detected temperature of the fourth temperature sensor 34 (the temperature of the heat medium flowing out of the use-side heat exchanger 26) Th is larger than the threshold value T1. This is not limiting, and the leakage of the heat medium from the heat-medium circulation circuit for heating may be determined based on a temperature difference of the heat medium flowing out of each use-side heat exchanger 26. That is because the higher the position where the use-side heat exchanger is installed, the lower the inflow amount of the heat medium becomes, and the heat medium flowing out of the use-side heat exchanger installed at a higher position has a larger temperature rise.

Also, based on the detected temperature of the third temperature sensor 33 (the temperature of the heat medium flowing into the use-side heat exchanger 26), it is possible to determine whether the heat medium leaks out of the heat-medium circulation circuit for heating. That is because if the heat medium is leaking from the heat-medium circulation circuit for heating, the temperature of the heat medium flowing into the use-side heat exchanger 26 is changed.

Also, in Embodiment 1, the air-conditioning apparatus 100 is operated in the cooling only operation mode after operation in the heating only operation mode, and then, leakage of the heat medium from the heat-medium circulation circuit is determined. This is not limiting, and it is needless to say that the leakage of the heat medium from the heat-medium circulation circuit may be determined after the air-conditioning apparatus 100 is operated in the cooling only operation mode and then, in the heating only operation mode.

Also if there is the indoor unit 2 which is under the cooling operation or the heating operation, leakage detection of the heat medium may be made while the coding operation or the heating operation is being performed. At this time, it is only necessary that the value of the threshold value T1 is changed in accordance with the air-conditioning load of the use-side heat exchanger 26 of the indoor unit 2 during operation. Also, leakage detection of the heat medium may be made by comparing the temperature of the heat medium, which is expected from the air-conditioning load of the use-side heat exchanger 26, with the actual temperature of the heat medium.

Embodiment 2

In Embodiment 1, the heat-medium leakage from the heat-medium circulation circuit for heating and the heat-medium leakage from the heat-medium circulation circuit for cooling are detected in one process (FIG. 8). This is not limiting, and the heat-medium leakage from the heat-medium circulation circuit for heating and the heat-medium leakage from the heat-medium circulation circuit for cooling may be detected in separate processes. In Embodiment 2, the items not particularly described are assumed to be the same as those in Embodiment 1, and the same functions and configurations are described using the same reference numerals.

Figure 9:
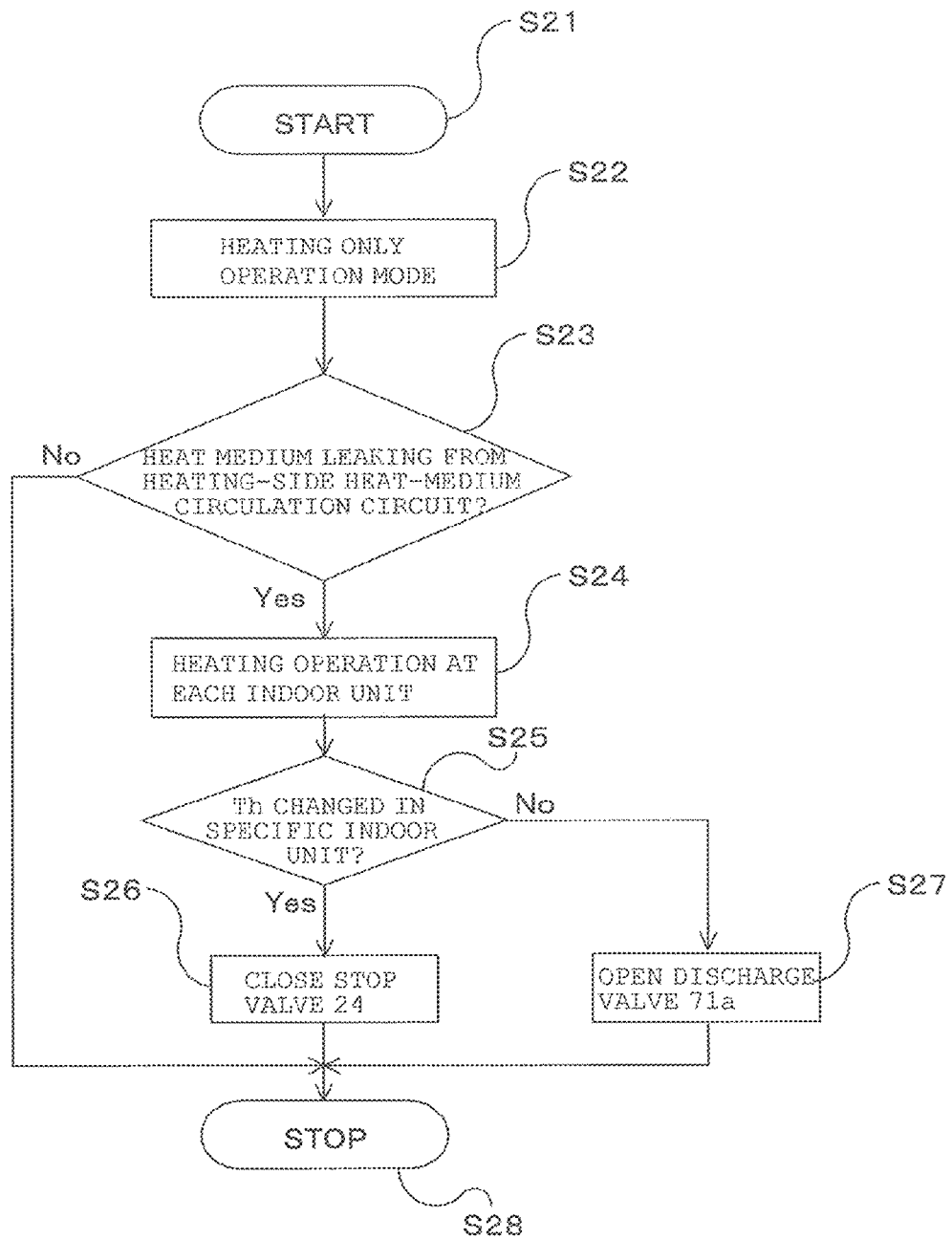
FIG. 9 is a flowchart illustrating a method of detecting heat leakage from a heat-source circulation circuit for heating according to Embodiment 2.
Figure 10:
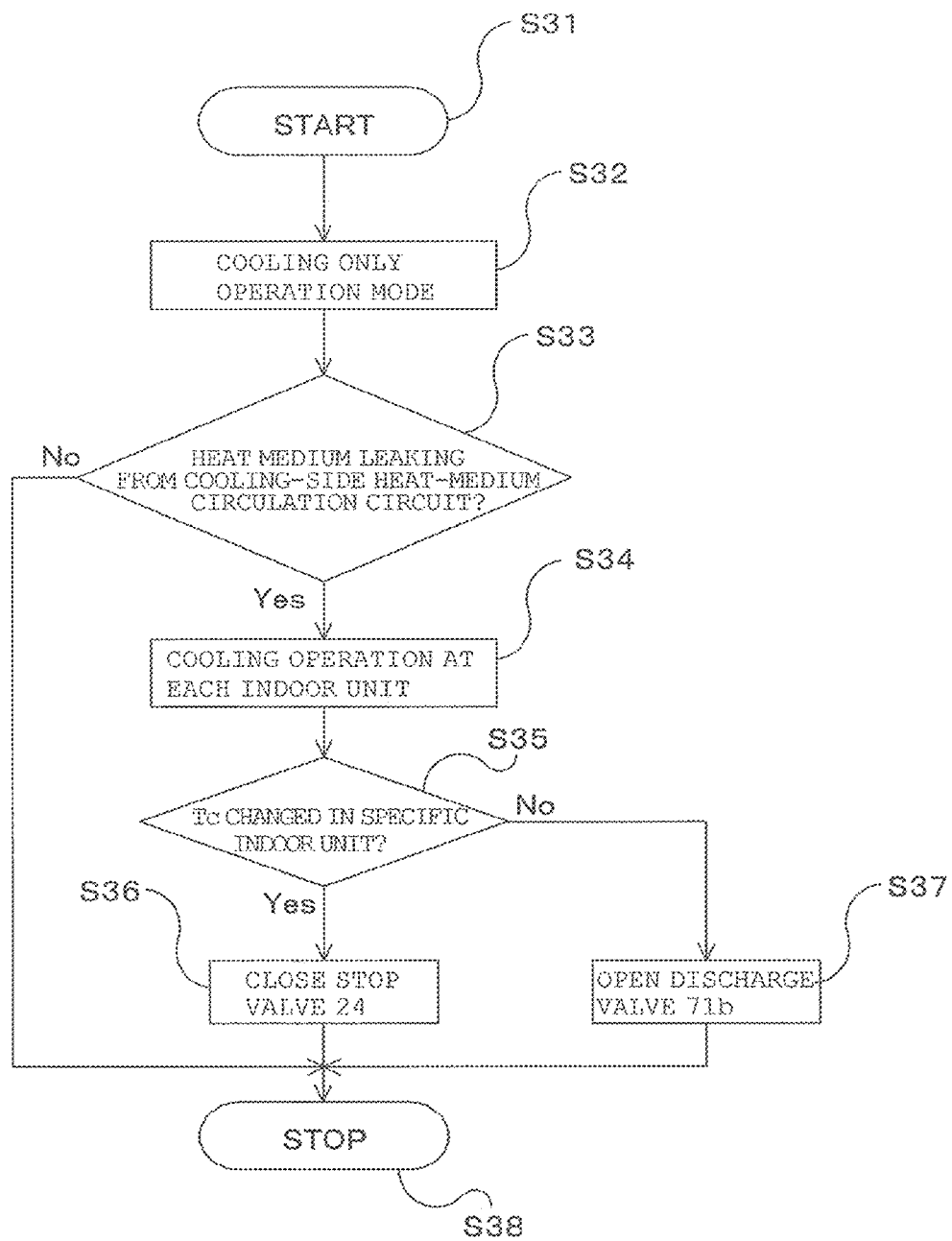
FIG. 10 is a flowchart illustrating a method of detecting heat leakage from a heat-source circulation circuit for cooling according to Embodiment 2.

FIGS. 9 and 10 are flowcharts illustrating an example of a leakage detecting method of a heat medium according to Embodiment 2 of the present invention. FIG. 9 is a flowchart illustrating a detecting method of heat leakage from the heat source circulation circuit for heating. FIG. 10 is a flowchart illustrating a detecting method of heat leakage from the heat-source circulation circuit for cooling.

First, using FIG. 9, a process of detecting leakage of the heat medium from the heat-source circulation circuit for heating will be described.

When a heat-medium leakage detection process is started (Step S21), the controller 60 puts the air-conditioning apparatus 100 into the heating only operation mode (Step S22). And the controller controls the opening degree of the flow control valve 25 and the air amount of the fan of the indoor unit 2 to values determined in advance. As a result, a heating load (air-conditioning load) of the use-side heat exchanger 26 can be controlled to a load determined in advance. In this state, the routine goes to Step S23.

At Step S23, it is determined whether the heat medium is leaking from the heat medium circuit for heating or not. In Embodiment 2, whether or not the heat medium is leaking from the heat-medium circulation circuit for heating is determined by whether a detected temperature (the temperature of the heat medium flowing out of the use-side heat exchanger 26) Th of the fourth temperature sensor 34 is larger than the threshold value T1 or not. If the detected temperature Th of the fourth temperature sensor 34 falls under the threshold value T1, it is determined that the heat medium is leaking from the heat medium circuit for heating, and then, the routine goes to Step S24. If the detected temperature Th of the fourth temperature sensor 34 is larger than the threshold value T1, it is determined that the heat medium is not leaking from the heat-medium circuit for heating. And the routine goes to Step S28, and the leakage detection of the heat medium is finished.

At Step S24, the heating operation is performed at each indoor unit 2. That is, the heat medium is made to flow into each of the use-side heat exchangers 26 one by one. Then, the temperature Th of the heat medium flowing out of the use side heat exchanger 26 during the heating operation is detected by the fourth temperature sensor 34. When the heating operations of all the indoor units 2 (the indoor unit 2a to the indoor unit 2d) are finished, the routine goes to Step S25.

At Step S25, it is determined whether the detected temperature Th of the fourth temperature sensor 34 has been lowered or not during the heating operation of the specific indoor unit 2. If the detected temperature Th of the fourth temperature sensor 34 has been lowered during the heating operation of the specific indoor unit 2, it is determined that the heat medium is leaking from this indoor unit 2 side. Then, the routine goes to Step S26, where the stop valve 24 connected to the use-side heat exchanger 26 of this indoor unit 2 is closed. After that, the routine goes to Step S28, and the leakage detection of the heat medium is finished.

On the other hand, if the lowered amount of the detected temperature Th during the cooling operation of each indoor unit 2 has not been changed, it is determined that the heat medium is leaking from the intermediate unit side of the heat-medium circulation circuit for heating. Then, the routine goes to Step S27, the discharge valve 71a is opened, and the heat medium in the heat-medium circulation circuit for heating is discharged. After that, the routine goes to Step S28, and the leakage detection of the heat medium is finished.

Subsequently, a process of detecting leakage of the heat medium from the heat-source circulation circuit for cooling will be described using FIG. 10.

When a heat-medium leakage detection process is started (Step S31), the controller 60 puts the air-conditioning apparatus 100 into the cooling only operation mode (Step S32). And the controller controls the opening degree of the flow control valve 25 and the air amount of the fan of the indoor unit 2 to values determined in advance. As a result, a cooling load (air-conditioning load) of the use-side heat exchanger 26 can be controlled to a load determined in advance. In this state, the routine goes to Step S33.

At Step S33, it is determined whether the heat medium is leaking from the heat medium circuit for cooling or not. In Embodiment 2, whether or not the heat medium is leaking from the heat-medium circulation circuit for heating is determined by whether a detected temperature (the temperature of the heat medium flowing out of the use-side heat exchanger 26) Tc of the fourth temperature sensor 34 is larger than a threshold value T2 or not. If the detected temperature Tc of the fourth temperature sensor 34 becomes larger than the threshold value T2, it is determined that the heat medium is leaking from the heat medium circuit for cooling, and then, the routine goes to Step S34. If the detected temperature Tc of the fourth temperature sensor 34 is not more than the threshold value T2, it is determined that the heat medium is not leaking from the heat-medium circuit for cooling. And the routine goes to Step S38, and the leakage detection of the heat medium is finished.

At Step S34, the cooling operation is performed for each indoor unit 2. That is, the heat medium is made to flow into each of the use-side heat exchangers 26 one by one. Then, the temperature Tc of the heat medium flowing out of the use side heat exchanger 26 during the cooling operation is detected by the fourth temperature sensor 34. When the cooling operations of all the indoor units 2 (the indoor unit 2a to the indoor unit 2d) are finished, the routine goes to Step S35.

At Step S35, it is determined whether the detected temperature Tc of the fourth temperature sensor 34 has risen or not during the cooling operation of the specific indoor unit 2. If the detected temperature Tc of the fourth temperature sensor 34 has risen during the cooling operation of the specific indoor unit 2, it is determined that the heat medium is leaking from this indoor unit 2 side. Then, the routine goes to Step S36, where the stop valve 24 connected to the use-side heat exchanger 26 of this indoor unit 2 is closed. After that, the routine goes to Step S38 and the leakage detection of the heat medium is finished.

On the other hand, if the detected temperature Th of the fourth temperature sensor 34 has not been changed during the cooling operation of the specific indoor unit 2, it is determined that the heat medium is leaking from the intermediate unit side of the heat-medium circulation circuit for cooling. Then, the routine goes to Step S37, the discharge valve 71b is opened, and the heat medium in the heat-medium circulation circuit for cooling is discharged. After that, the routine goes to Step S38, and the leakage detection of the heat medium is finished.

As described above, in the air-conditioning apparatus 100 configured as above, too, leakage of the heat medium from the heat-medium circulation circuit can be detected on the basis of the temperature of the heat medium flowing out of the use-side heat exchanger 26.

Embodiment 3

In Embodiment 1 and Embodiment 2, the leakage of the heat medium from the heat-medium circulation circuit is detected on the basis of the temperature of the heat medium circulating through the heat-medium circulation circuit. This is not limiting, and the leakage of the neat medium from the heat-medium circulation circuit is detected on the basis of a current value of the pump 21. In Embodiment 3, the items not particularly described are assumed to be the same as those in Embodiment 1 or Embodiment 2, and the same functions and configurations are described using the same reference numerals.

Figure 11:
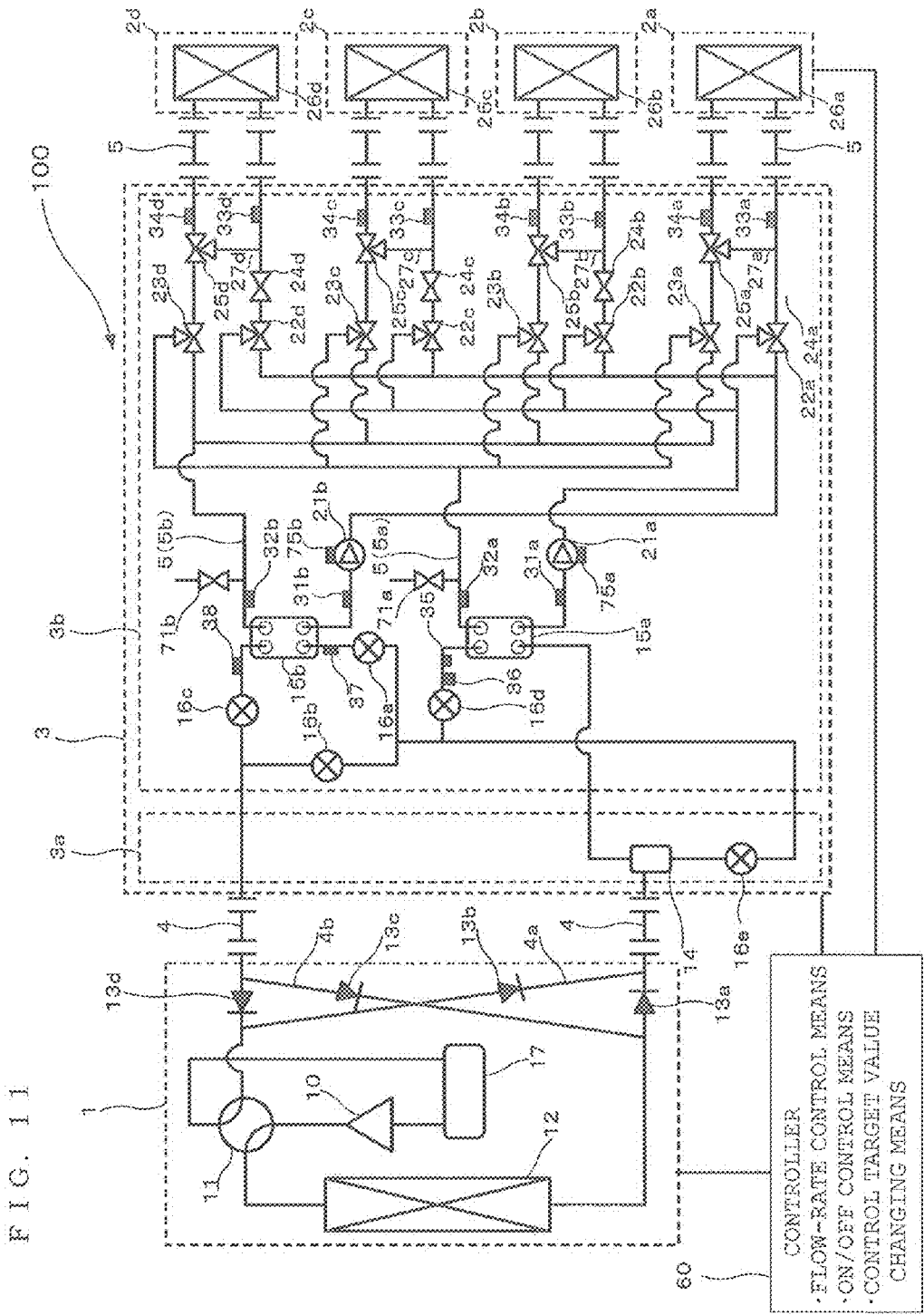
FIG. 11 is an outline circuit diagram illustrating a configuration of an air-conditioning apparatus according to Embodiment 3.

FIG. 11 is an outline circuit diagram illustrating a configuration of an air-conditioning apparatus according to Embodiment 3 of the present invention. As shown in FIG. 11, in the first pump 21a disposed in the heat-medium circulation circuit for heating, a current detection portion 75a that detects a current flowing through this first pump 21a (more specifically, a motor of the first pump 21a) is disposed. Also, in the second pump 21b disposed in the heat medium circulation circuit for cooling, a current detection portion 75b that detects a current flowing through this second pump 21b (more specifically, a motor of the second pump 21b) is disposed.

For example, if the air-conditioning apparatus 100 is operated by setting an air-conditioning load of each use-side heat exchanger 26 to a predetermined air-conditioning load, a value of the current flowing through the first pump 21a and a value of the current flowing through the second pump 21b are close to certain values, respectively. At this time, if a heat medium leaks from the heating-side heat-medium circulation circuit, for example, a heat-medium amount in the heating-side heat-medium circulation, circuit is decreased, and the lead of the first pump 21a becomes small. Thus, the value of the current flowing through the first pump 21a is lowered. Also, if the heat medium leaks from the cooling-side heat-medium circulation circuit, a heat-medium amount in the cooling-side heat-medium circulation circuit is decreased, and the load of the second pump 21b becomes small. Thus, the value of the current flowing through the second pump 21b lowered.

Therefore, in the air-conditioning apparatus 100 configured as above, the leakage of the heat medium from the heat-medium circulation circuit can be detected on the basis of the values of the currents flowing through the first pump 21a and the second pump 21b disposed in the heat-medium circulation circuit.

Even if the load of each use-side heat exchanger 26 is fluctuated, it is possible to detect the heat medium from the heat-medium circulation circuit on the basis of the values of the currents flowing through the first pump 21a and the second pump 21b. For example, by comparing the values of the currents flowing through the first pump 21a and the second pump 21b, which are expected from the bad of the use-side heat exchanger 26, with the values of the currents actually flowing through the first pump 21a and the second pump 21b, it is possible to detect the heat medium from the heat-medium circulation circuit.

Also, it is needless to say that the leakage of the heat medium from the heat-medium circulation circuit may be detected by using both the leakage detecting method of the heat medium according to Embodiment 3 and the heat medium detecting method according to Embodiment 1 or Embodiment 2.

Embodiment 4

Leakage of the heat medium from the heat-medium circulation circuit may be detected on the basis of the temperature related to the pump 21. In Embodiment 4, the items not particularly described are assumed to be the same as those in Embodiment 1 to Embodiment 3, and the same functions and configurations are described using the same reference numerals.

Figure 12:
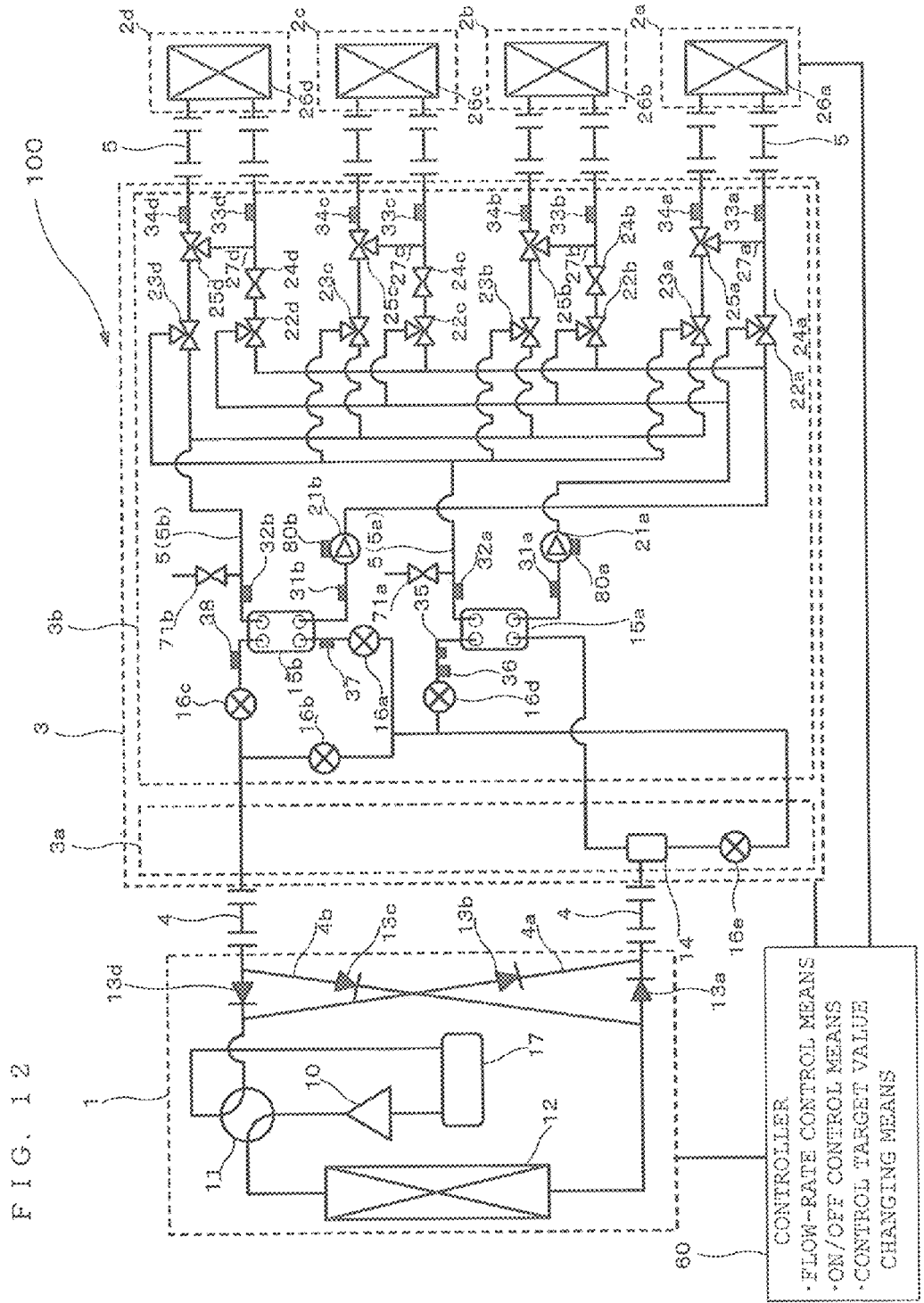
FIG. 12 is an outline circuit diagram illustrating a configuration of an air-conditioning apparatus according to Embodiment 4.

FIG. 12 is an outline circuit diagram illustrating a configuration of an air-conditioning apparatus according to Embodiment 4 of the present invention. As shown in FIG. 11, an eighth temperature sensor 80a is disposed in a housing, for example, of the first pump 21a disposed in the heat-medium circulation circuit for heating. Also, an eighth temperature sensor 80b is disposed in a housing, for example, of the second pump 21b disposed in the heat-medium circulation circuit for cooling. Here, the eighth temperature sensor 80a and the eighth temperature sensor 80b correspond to a temperature detection portion related to the pump of the present invention.

For example, if the air-conditioning apparatus 100 is operated by setting the air-conditioning load of each use-side heat exchanger 26 to a predetermined airy conditioning load, the temperature related to the first pump 21a and the temperature of the second pump 21b are close to certain temperatures, respectively. At this time, if the heat medium leaks from the heating-side heat-medium circulation circuit or the cooling-side heat-medium circulation circuit, for example, a circulation amount of the heat medium flowing through the heating-side heat-medium circulation circuit or the cooling-side heat-medium circulation circuit is decreased. Thus, in the first pump 21a and the second pump 21b, a cooling effect by the heat medium is weakened, and the temperature of the first pump 21a or the second pump 21b is raised.

Therefore, in the air-conditioning apparatus 100 configured as above, the leakage of the heat medium from the heat-medium circulation circuit can be detected on the basis of the temperatures related to the first pump 21a and the second pump 21b disposed in the heat-medium circulation circuit.

Even if the load of each use-side heat exchanger 26 is fluctuated, it is possible to detect the heat medium from the heat-medium circulation circuit on the basis of the temperatures of the first pump 21a and the second pump 21b. For example, by comparing the temperatures of the first pump 21a and the second pump 21b, which are expected from the load of the use-side heat exchanger 26, with the actual temperatures of the first pump 21a and the second pump 21b, it is possible to detect the heat medium from the heat-medium circulation circuit.

Also, it is needless to say that the leakage of the heat medium from the heat-medium circulation circuit may be detected by using both the leakage detecting method of the heat medium according to Embodiment 4 and the heat-medium detecting method according to Embodiment 1 to Embodiment 3.

The invention claimed is:

1. An air-conditioning apparatus comprising:
   at least one intermediate heat exchanger that exchanges heat between a refrigerant changing in two phases or a refrigerant in a supercritical state and a heat-medium such as water and anti-freezing fluid different from said refrigerant;
   a refrigeration cycle in which a compressor, an outdoor heat exchanger, at least one expansion valve, and a refrigerant-side channel of said intermediate heat exchanger are connected via a pipeline through which said refrigerant flows, and
   a heat-medium circulation circuit in which a heat-medium side channel of said intermediate heat exchanger, a pump, and a plurality of use-side heat exchangers are connected via a pipeline through which said heat medium flows,
   opening/closing devices that open or close each channel of the heat-medium at an inflow side of each of said use-side heat exchangers;
   a first temperature sensor arranged to detect a temperature of the heat-medium that flows in the heat-medium circulation circuit or a second temperature sensor arranged to detect a temperature related to said pump; and
   a controller configured for detecting a leakage of the heat-medium from the heat-medium circulation circuit on the basis of a temperature of said heat-medium flowing through said heat-medium circulation circuit detected by the first temperature sensor or a temperature detected by the second temperature sensor by making said heat-medium flow into said use-side heat exchangers one by one by operating said opening/closing devices.

2. The air-conditioning apparatus of claim 1, wherein when the air-conditioning apparatus comprises the first temperature sensor, the first temperature sensor detects the temperature of said heat-medium flowing out of said use-side heat exchangers, and
   the controller is configured to:
   operate said refrigeration cycle and said heat-medium circuit so that an air-conditioning load of each of said use-side heat exchangers becomes a predetermined value;
   detect leakage of the heat-medium from said heat-medium circulation circuit during a heating operation, on the basis of a decrease amount in the detection temperature of said first temperature sensor; and
   detect leakage of the heat-medium from said heat-medium circulation circuit during a cooling operation, on the basis of an increase amount in the detection temperature of said first temperature sensor.

3. The air-conditioning apparatus of claim 1, wherein when the air-conditioning apparatus comprises the second temperature sensor, the controller is configured to:
   operate said refrigeration cycle and said heat-medium circuit so that an air-conditioning load of each of said use-side heat exchangers becomes a predetermined value; and detect leakage of the heat-medium from said heat-medium circulation circuit on the basis of an increase amount in the value detected by the second temperature sensor disposed in the housing of said pump.

4. The air-conditioning apparatus of claim 1, wherein
if said heat-medium leaks from a pipeline connected to one of said use-side heat exchangers
the controller is configured to close an opening/closing device connected to one of said use-side heat exchangers of said opening/closing devices so as to suppress leakage of said heat-medium.

5. The air-conditioning apparatus of claim 1, comprising:
a heat-medium discharge portion disposed in said heat-medium circulation circuit; and wherein
the controller is configured to discharge said heat-medium inside said heat-medium circulation circuit from said heat-medium discharge portion if it is determined that said heat-medium leaks from said heat-medium circulation circuit.

6. The air-conditioning apparatus of claim 1, wherein
the controller is configured to detect leakage of the heat-medium from said heat-medium circulation circuit by comparing a temperature of the heat-medium, which is expected from an air-conditioning load of each of said use-side heat exchangers, with an actual temperature of the heat-medium.

* * * * *